United States Patent
Cao et al.

(10) Patent No.: US 6,769,280 B2
(45) Date of Patent: Aug. 3, 2004

(54) REAL-TIME DRAW-IN SENSORS AND METHODS OF FABRICATION

(75) Inventors: Jian Cao, Wilmette, IL (US);
Junghoon Lee, Wilmette, IL (US);
Michael Peshkin, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 10/140,916

(22) Filed: May 7, 2002

(65) Prior Publication Data

US 2002/0186007 A1 Dec. 12, 2002

Related U.S. Application Data

(60) Provisional application No. 60/289,192, filed on May 7, 2001.

(51) Int. Cl.[7] .............................................. B21D 22/22
(52) U.S. Cl. ............................ 72/17.3; 72/347; 72/350
(58) Field of Search .............................. 72/17.3, 19.4, 72/347, 350, 351; 324/207.18, 207.19; 336/200; 29/847

(56) References Cited

U.S. PATENT DOCUMENTS

| | | | |
|---|---|---|---|
| 4,613,843 | A | 9/1986 | Esper et al. |
| 5,319,951 | A | 6/1994 | Da Ré |
| 5,563,458 | A | 10/1996 | Ericson |
| 6,043,644 | A | 3/2000 | De Coulon et al. |
| 2002/0184935 | A1 | 12/2002 | Naumann et al. |

FOREIGN PATENT DOCUMENTS

| | | |
|---|---|---|
| EP | 589066 A1 | 3/1994 |
| JP | 63-130231 A | 2/1988 |

OTHER PUBLICATIONS

Internet Document The Engineering Laboratory, "Develop in step with IVF" Website http://www.ivf.se/UK_RootWeb/ny_engelska/the%20engineering%20laboratory/enigeering/Last update Oct. 9, 2001 pp. 1–7.

Internet Document The Ohio State University, "Wrinkling and Springback in Electromagnetic Sheet Metal Forming and Electromagnetic Ring Compression" Website http://www.mse.eng.ohio-state.edu/~Daehn/mahadevanthesis/ (1997) pp. 1–116.

*Primary Examiner*—Lowell A. Larson
(74) *Attorney, Agent, or Firm*—Reinhart Boerner Van Deuren s.c.

(57) ABSTRACT

A method and system for providing real time measurements of draw-in for closed loop control of a metal forming process including an elongated sensor on one of the tools positioned in the proximity of the deformation zone and adjacent to an edge of a sheet metal blank being formed. The sensor includes coils disposed in a signal coupling relationship and during the forming process, a signal applied to one of the coils induces a signal in the coil, producing a response signal that varies linearly as a function of the amount of overlap between the sensor and the sheet metal blank as the sheet metal blank is drawn into the deformation zone. A feedback signal produced from the response signal is used to control a parameter of the forming process as a function of retreat of the edge of the sheet metal blank into the deformation zone.

21 Claims, 13 Drawing Sheets

REAL-TIME DRAW-IN SENSORS AND METHODS OF FABRICATION

CROSS REFERENCE TO RELATED APPLICATION

This application claims priority of provisional application serial number 60/289,192, filed May 7, 2001.

BACKGROUND OF THE INVENTION

Field of the Invention

This invention relates to sheet metal forming processes, and more particularly, to a sensor system and sensing element for detecting draw-in of a metal blank during metal forming operations.

Sheet metal forming is one of the predominant processes in the manufacture of automobiles (about 300 parts per vehicle), and also is widely employed in the manufacture of aircraft, appliances, beverage cans and many other products. The popularity of this type of metal-forming/stamping is mainly due to the high degree of design flexibility and its low cost, both in the stamping and in subsequent assembly. It is especially attractive for the manufacture of high strength, low-weight components.

In a typical sheet metal forming process of the prior art, as shown in FIG. 1, a blank sheet 12 is placed between a blank holder 14 and a die 16. During the forming process, the sheet 12 under the blank holder 14 is drawn into the deformation zone 18 by a punch 20. The draw-in amount "d" is the translation of the edge(s) of the sheet 12 from an initial positions(s) 22 to the draw-in position 24. The success of a forming process depends entirely on how one designs the tooling geometry and forming parameters for a specific sheet material. The binder acts to provide a tangential restraining force to the sheet to determine how much material flows into the deformation cavity, the draw-in amount at each cross section. This restraining force is generated either through the frictional force between the flat binder and the sheet material or through a combination of the frictional force and the bending/unbending effect of material going through a drawbead 26 (see FIG. 1).

Excessive material draw-in leads to the occurrence of wrinkling, which is usually undesired in final sheet metal parts for functional reasons. Wrinkling is also unacceptable for aesthetic reasons in the outer skin panels where the final part appearance is crucial. Wrinkling on mating surfaces can adversely affect subsequent part assembly use and function, such as sealing and welding. In addition, severe wrinkles may damage or even destroy dies. On the other hand, an unduly limited material draw-in amount leads to tearing failure in the sheet metal, a result which is just as undesirable. Therefore, proper material flow and draw-in amount are critical to the ultimate success of a metal-forming process.

Another concern of the prior art is that draw-in amounts around the periphery of a sheet metal piece or product are usually uneven due to a combination of complex piece geometry and material anisotropy. An existing method to monitor a forming process uses punch forces at four tooling corners, but is not sophisticated enough for use with formation of irregular shapes. Local sensors currently used in such applications include a mechanically based linear transducer (LVDT type) for sensing the material draw-in, a mouse-like draw-in sensor and a local friction force sensor. The installation of such sensors requires either additional setup time with each forming or intricate tooling modification. The lack of effective and affordable local measurement tools has hampered the implementation of active control systems for industrial metal-forming processes, a state which in turn has resulted in long development time and inconsistent final sheet metal products.

SUMMARY OF THE INVENTION

In light of the foregoing, it is an object of the present invention to provide a sensor device and/or element, together with methods for its production and/or assembly, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can also be an object of the present invention to provide a sensor device and/or system utilizing sensing elements useful in the formation of complex metal piece geometries, such use without excessive tooling modification or set-up time.

It can also be an object of the present invention to provide a sensor device and/or sensing element which can, during the die try-out period, measure and monitor the amount of draw-in, thereby, assisting tooling modification and the determination of process parameters to delay/avoid tearing or wrinkling failure and to keep springback under control.

It can also be an object of the present invention to provide a sensor device and/or sensing element which can provide quantitative measurements of local material movements, to which can be compared with numerical simulations.

It can also be an object of the present invention to provide a sensor device and/or sensing element which can, during a metal-forming process, measure, control and monitor the amount of draw-in material, thereby reducing the incidence of material wrinkling or tearing failure.

It can also be an object of the present invention to provide a sensor device and/or sensing element which produces an output indicative of real-time measurement of the draw-in movement of a metal sheet/plate, such measurement as can be utilized for closed-loop control of a metal-forming process to achieve the optimal (or predetermined) forming condition regardless of variations in incoming material, working environment, operators and process variables. The sensor can be used to provide an indication at the beginning of the forming process to indicate whether the blank is placed correctly at the desired initial position.

It can be another object of the present invention to provide a durable, robust sensing element for use in a variety of metal-forming systems and operations, such as for the measurement of the retreat or movement of the edge of a metal sheet into a mold or toward a deformation zone during a forming operation.

Other objects, features, benefits and advantages of the present invention will be apparent from this summary and the following descriptions of various preferred embodiments, and will be readily apparent to those skilled in the art having knowledge of various metal-forming operations and/or control techniques. Such objects, features, benefits and advantages will be apparent from the above as taken into conjunction with the accompanying examples, data, figures and all reasonable inferences to be drawn therefrom.

In part, the present invention includes a system for sensing the draw-in amount of metal during a forming process, thereby effecting related elements of monitoring and control. A sensor of this invention can include a sensing element and an electronic circuit, which provides a signal, indicative of draw-in amount, to a computer (or a processor) which, in turn, can control aspects of the forming operation (such as, pressure on the binder at different places, drawbead penetration height, etc.). Benefits of such a sensor system/ sensing element include provisions of 1) a tool for process optimization during the development stage; 2) control over the forming process to significantly reduce part-to-part variations and compensate for any incoming material variations; and 3) a device for quick process diagnosis during production.

In one embodiment, the sensing element comprises a pair of coils disposed in signal coupling relationship such that an excitation signal applied to one coil produces a signal in the other coil. The presence of a ferrous or non-ferrous metal, such as a metal plate, in the proximity of the coils affects the magnetic field lines, changing the degree of mutual inductance, or magnetic coupling, between the coils in correspondence with the amount of movement of the metal plate relative to the sensing element. Thus, the response signal, or signal output of the sensing element, provides a real-time measurement of the extent of overlap of the sensing element by the edge portion of the metal plate being formed. The response signal can be supplied to a process controller for process diagnosis and closed-loop control of the forming process.

In part, the present invention can also include methods and related aspects of sensing element fabrication. Fabrication can be in conjunction with and/or on conventional printed circuit board or flexible printed circuit board. Likewise, fabrication of a conductive pattern can be achieved through any of a number of techniques or procedures each of which will be well-known and understood by those skilled in the art and made aware of this invention.

Accordingly, there is provided herein a process for fabricating a sensing element for use in measuring the amount of movement of an edge of a metal plate towards a deformation zone during a forming process. In one embodiment, the fabricating process is carried out using a contact printing and etching technique wherein a conductor pattern is formed on a detachable polymer that is removably applied to a cylindrical surface of a forming cylinder. After contact printing of a masking pattern onto a thin layer of conductive material disposed on the polymer, the conductive material is selectively etched to produce the conductors forming the coils of the sensing element, and the conductor bearing polymer is then cut and peeled off the forming cylinder.

Further in accordance with the invention, there is provided a method for providing real-time measurements of draw-in for closed-loop control of a metal forming process in which a blank of sheet metal, held in place between cooperating tools a die of a sheet metal forming apparatus, is drawn into a deformation zone of the forming apparatus by a further tool. The method includes locating a sensing element on one of the tools, the sensing element including first and second coils disposed in signal coupling relationship; applying an excitation signal to the first coil for inducing a signal in the second coil; and producing a feed-back from the signal induced in the second coil, as the sheet metal is drawn into the deformation zone, for controlling a parameter of the forming process as a function of the amount of retreat of an edge of the sheet metal blank into the deformation zone. For example, the feed-back produced as the result of monitoring draw-in during stroke enables modifying the tooling or changing local press parameters, such as drawbead shape, drawbead height, type, cylinder pressure, etc. Moreover, the measurement results can be used to test accuracy of numerical simulations by comparing the simulation with experimental results and can be used a quality control tool during real-time operating mode. In addition, such measurements provide information that can be used to adjust local or subsequent forming processes to ensure greater parts consistency even for varied material lots. Also, measurements can be continuously plotted throughout the stroke. The actual draw-in can be determined if it is recorded during stroke regardless of springback.

DESCRIPTION OF THE DRAWINGS

These and other advantages of the present invention are best understood with reference to the drawings, in which.

DETAILED DESCRIPTION OF PREFERRED EMBODIMENTS

Figure 1:
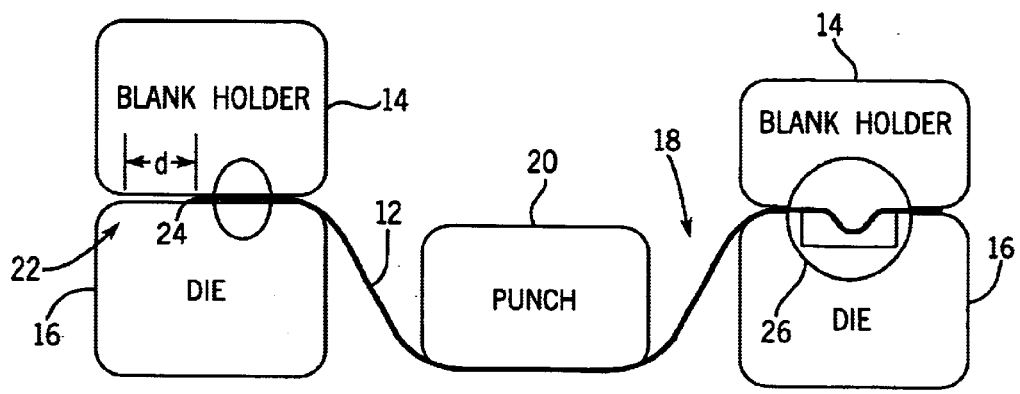
FIG. 1, which is labeled "Prior Art", is a simplified representation of a sheet metal forming process.
Figure 2:
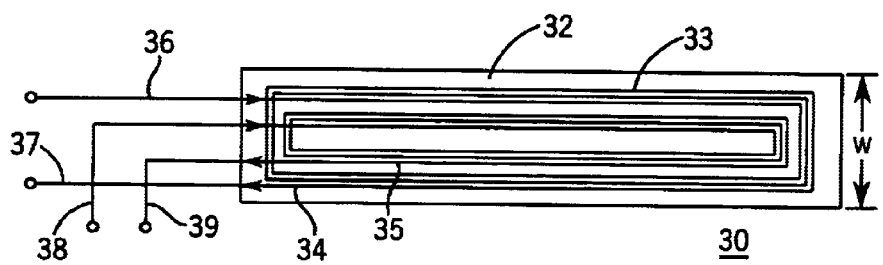
FIG. 2 is a plan view of a sensing element provided by the invention.
Figure 3:
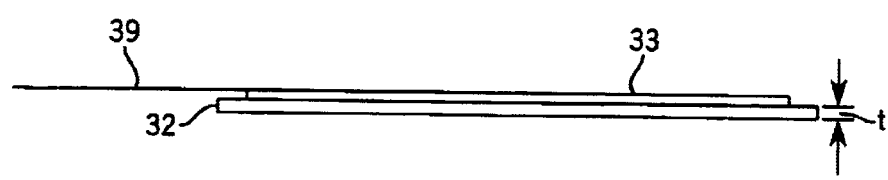
FIG. 3 is a side elevation view of the sensing element of FIG. 2

Referring to FIGS. 2 and 3, there is shown a sensor device or sensing element 30 for use in a variety of metal-forming systems and operations, such as for the measurement of the retreat or movement of the edge of a flat metal sheet into a mold or toward a deformation zone during a forming operation. In one embodiment, the sensing element 30 includes a base or support member 32 on which is disposed electrically conductive material 33. In accordance with the invention, the sensing element 30 is fabricated to have a unique configuration and/or design which simplifies the fabrication of the sensing element, facilitates mounting of the sensing element on tooling of forming processes in which the sensing element is used, and which allows the sensing element to provide real-time measurement of process parameters, such as draw-in amount for a metal plate being formed, by detecting the extent or degree of coverage of the sensing element by the metal plate during steps of the forming process.

The sensing element 30 can be made in any length and is small in size typically several centimeters long, but very narrow, from less than about one millimeter to one or more centimeters, but the narrower the better. A typical size is one centimeter wide by six centimeters. However, other sizes are possible, such as only one or two millimeters wide. The length must be sufficient to accommodate the maximum expected movement of the metal edge being sensed. As to width, in general, narrower is preferable because a narrow sensing element is less susceptible to damage and is more accurate in terms of measuring the local material movement. The sensing element has a major axis that preferably extends along the direction of translation of the sheet metal blank. However, the axis of the sensing element can extend at an angle with respect to the direction of travel of the metal blank. In one preferred embodiment, the conductive material 33 of the sensing element 30 defines two long, flat rectangular coils 34 and 35 extending longitudinally of the sensing element 30. The flat coils facilitate manufacturing. Leads or wires 36 and 37 can be connected to coil 34 near ends thereof and leads or wires 38 and 39 can be connected to coil 35 near ends thereof. The coils 34 and 35 are interspersed or otherwise disposed near each other and have a mutual inductance such that an excitation current flowing in one coil induces a signal (voltage or current) in the other coil. In one preferred embodiment, each of the multi-turn coils 34 and 35 includes three turns and coil 35 is generally coplanar with and located within the turns of coil 34 and with conductor portions of coil 35 extending substantially parallel to corresponding conductor portions of coil 34 as shown in FIG. 2, for example. Moreover, the number of turns for the two coils can be greater than three or less than three, provided there are a sufficient number of turns to provide magnetic (inductive) coupling, or mutual inductance between the two coils. Moreover, the number of turns of coil 34 can be greater than or less than the number of turns for coil 35. Coil 34 can even be only one turn, that is, not a multiplicity of turns.

In one embodiment, the base 32 on which the coil pattern is fabricated, is a thin, narrow polymer film. Materials for such a detachable polymer include most thin film polymers such as SU-8®, Parylene®, and Polyimide®. The width "w" of the polymer film forming the base 32 can be from about 100 μm to about 1 centimeter. The thickness "t" of the polymer film can be controlled to provide a film dimensioned between about 1 μm to about 500 μm. A film thickness dimension of 50 μm is suitable and provides the requisite mechanical toughness for sensing element 30. The polymer film base enables the sensing element to be applied to a curved tooling surface.

The conductive pattern 33 can be formed of a highly electrically conductive material. In one embodiment, the conductive pattern 33 includes a layer of gold (Au) which can be 50 Å to 1000 Å thick formed on an adhesion layer of titanium (Ti), which can be 50 Å thick.

In accordance with a broader aspect of this invention, it is possible for the sensing element to include more than two coils and/or to include two or more coils arranged in a non-rectangular configuration. In addition, the coils can be disposed with one coil overlying the other coil, with the coils disposed adjacent to one another in non-contacting relation, or with the coils partially overlapped.

Moreover, this invention contemplates use of a single coil, such as coil 34 (FIG. 2), and measurement of the self-inductance of the coil. The self-inductance of the single coil varies according to the proximity of and coverage by metal nearby. Unlike a conventional proximity sensor, the coil can be extended or stretched out in one direction, to allow the sensing element momentarily to detect the extent or degree of coverage of the sensing element by a metal plate. In contrast, a proximity sensor usually is employed to detect the presence or absence of metal (usually ferrous), or the proximity of metal to the sensor, rather than the degree of coverage of the sensor by the metal.

With regard to various sensing elements of this invention, micro-fabrication techniques can be used in fabricating the sensing elements. In particular, micro-fabrication techniques can be used to fabricate the conductor pattern 33 on polymer film 32. The resulting sensing element 30 can be taped or otherwise applied to a tool surface to enable measurement of the amount of movement of an edge of a metal plate towards a deformation zone during a forming process.

FIGS. 4–7 illustrate steps in a micro-fabrication process in accordance with this invention for fabricating the sensing element 30 (FIG. 2). A preferred approach of this invention combines use of previously known microfabrication techniques, use of a forming drum or cylinder 40 having a cylindrical forming surface 42 (FIG. 7), and producing a continuous pattern 33 on a polymer film 32 that is detachably applied to the cylindrical surface 42. Contact printing and etching are known technologies, but the use of a detachable polymer film 32 on a cylindrical surface 42 is unique to this invention and a deviation from the prior art. While a preferred sensing element fabrication process provided in accordance with one aspect of the invention includes the use of a cylindrical surface in producing a conductive pattern on a polymer film, the novel draw-in sensing element in accordance with the invention can be fabricated using other fabrication processes as will be described.

More specifically, with reference to FIGS. 4–7, in accordance with the invention, the sensing element fabricating process is carried out using a contact printing and etching technique wherein conductor pattern 33 is formed on a detachable polymer 32 that is removably applied to a cylindrical surface 42 of forming cylinder 40. Prior to the contact printing step, the polymer film 32 can be uniformly coated with a thin layer of conductive material (e.g., Au, 50 Å–1000 Å, with Ti, 50 Å, adhesion layer), indicated by reference numeral 46 in FIGS. 4 and 5, by gas phase conformal coating or spinning of the cylinder 40 during liquid coating process, such techniques as would be well-known to those skilled in the art and aware of this invention.

Figure 4:
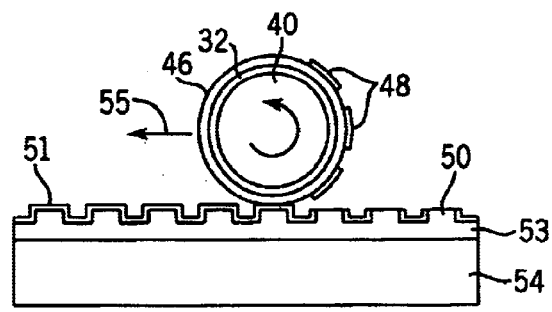
FIGS. 4–7 illustrate steps in one process in accordance with the present invention for fabricating the sensing element of FIG. 2.
Figure 8:
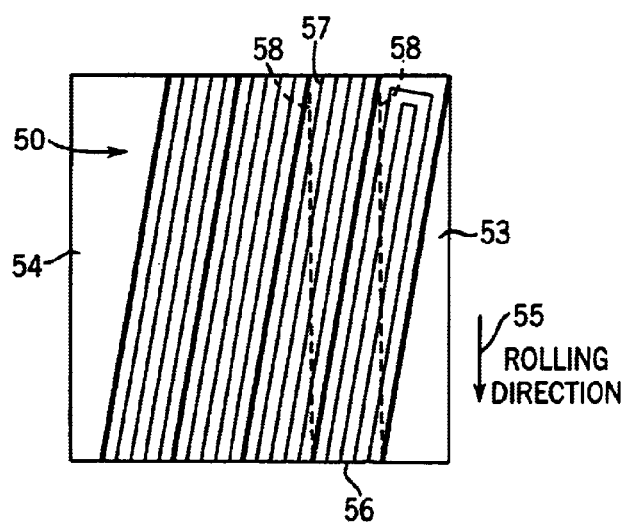
FIG. 8 illustrates a master pattern on a wafer for use in fabricating a continuous coil structure pattern on a rotatable cylinder in accordance with the invention.

Then, a masking pattern 48 is applied to the conductor bearing surface of the forming cylinder 40 in a contact printing step illustrated in FIG. 4. A master pattern 50, polydimethylsiloxane (PDMS) in preferred embodiments, representing the configuration of the conductor material to be fabricated on the polymer film, is provided on the surface 53 of a wafer or substrate 54. FIG. 8 is a simplified representation of a master pattern 50 for fabricating sensing element 30 having a continuous coil pattern 33 on the polymer film 32 which is detachably secured to the surface 42 of the cylinder 40. As can be seen, the master pattern extends at an angle with respect to the direction of rotation of the cylinder. Thus, an end portion 56 of a first segment of the master pattern 50 is aligned with an opposite end portion 57 of an adjacent segment of the master pattern. Thus, when the master pattern is transferred to the conductor bearing polymer film on the forming cylinder, the resulting masking pattern provided on the cylindrical surface will a portion defined by end portion 56 contiguous with a portion defined by end portion 57, for example, as indicated by the dashed parallel lines 58. Consequently, the master pattern 50 results in the formation of continuous conductors, which are helical in shape while contained on the cylinder, for the coils 34 and 35 of the sensing elements being fabricated.

A masking solution 51, preferably a self-assembled monolayer (SAM) forming reagent, is applied to the surface 53 of the wafer or substrate 54. Then, the forming cylinder 40 is rolled along the wafer 54 in contact with the mask/SAM bearing surface in the direction of the arrow 55 shown in FIG. 8, transferring the master pattern onto the conductive material on the polymer film. In one embodiment, the layer of mask/SAM solution transferred to the conductor pattern is approximately 20 Å thick. It is pointed out that the process forms a plurality of sensing elements, spaced around the circumference of the forming cylinder 40. In one embodiment, all of the sensing elements have the configuration of sensing element 30 (FIG. 2). However, different coil configurations can be produced by changing the master pattern, and several different coil configurations can be produced using a single master pattern having pattern portions that differ along the length of the wafer 54.

Figure 5:
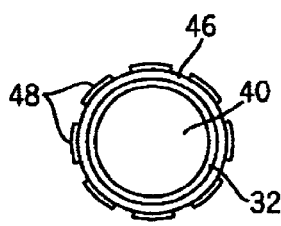
Figure 6:
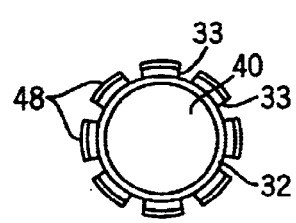

After contact printing of a masking pattern onto the thin layer of conductive material disposed on the polymer, FIG. 5, an etching step is used to produce the coil patterns on the polymer film 32 for the plurality of sensing elements as shown in FIG. 6. The achievable resolution of the pattern of conductors is limited only by the initial lithography step to make the master mold. High resolution, down to 1 μm, is possible in principle.

Figure 7:
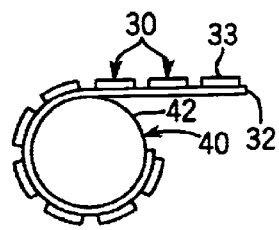

After etching of the coil pattern and removal of the masking solution to expose the conductor patterns 33 which have been formed, the conductor pattern bearing polymer film 32 is peeled off the forming cylinder 40 as shown in FIG. 7, and cut, providing the plurality of the sensing elements 30. Thermal shock can be used to effectively detach the polymer film from the surface of the cylinder 40. In such arrangement, a thermally activated (melting) coating is applied to the surface 42 of the cylinder 40 before coating the structural polymer film 32 with the mask/SAM solution.

Conventional lithography-based micro-fabrication technique (integrated circuit fabrication technique) can provide a very fine two-dimensional conductor pattern 33. The length of the conductor pattern, however, is limited by the size of the substrate or wafer on which a lithography pattern is disposed. The size of the wafer can vary from 2" to 12", but wafers larger than 5" typically have been used only for large-scale production in integrated circuit industries. The use of larger wafers may not be cost effective and may cause associated handling problems.

The fabrication method illustrated in FIGS. 4–7 is highly reproducible at a low cost. A contact printing master is reusable many times by just applying the mask/SAM solution to the wafer after each cycle of printing. The cylinder with polymer film 32 and conductor pattern 33 (e.g., Au+Ti) can be mass-produced by the polymer coating technique mentioned and or by an electroplating technique. After fabrication, the surface of coil pattern can be coated with another polymer to provide a protective layer.

There are numerous advantages associated with such an approach. The master pattern on the wafer is suitable even for small volume production. Various conductor patterns with high resolution can be fabricated quickly and easily. Very long, greater than 50 cm, continuous conductor patterns can be transferred from a relatively small size wafer, 4 inches (about 10 cm) in length, to the polymer film carried on the cylinder 40.

While a preferred sensing element fabrication process provided in accordance with one aspect of the invention includes the use of a cylindrical surface in producing a conductive pattern on a polymer film, the novel draw-in sensing element in accordance with the invention can be fabricated using other fabrication processes. For example, the fabrication of the sensing element 30 can be in conjunction with and/or on conventional printed circuit board or flexible printed circuit board. Likewise, the fabrication of a conductive pattern can be achieved through any of a number of techniques or procedures each of which will be well-known and understood by those skilled in the art and made aware of this invention.

The sensing elements of this invention, as inferred above, can be positioned, optionally, about the associated tooling. Such positions include, but are not limited to, placement of the sensing element on the surface of a binder, placement on the surface of a die, on the surface of a punch; in a groove machined in the tooling surface, or in a slot formed beneath the tooling surface. Moreover, separate sensing elements can be placed on both tools.

Figure 9:
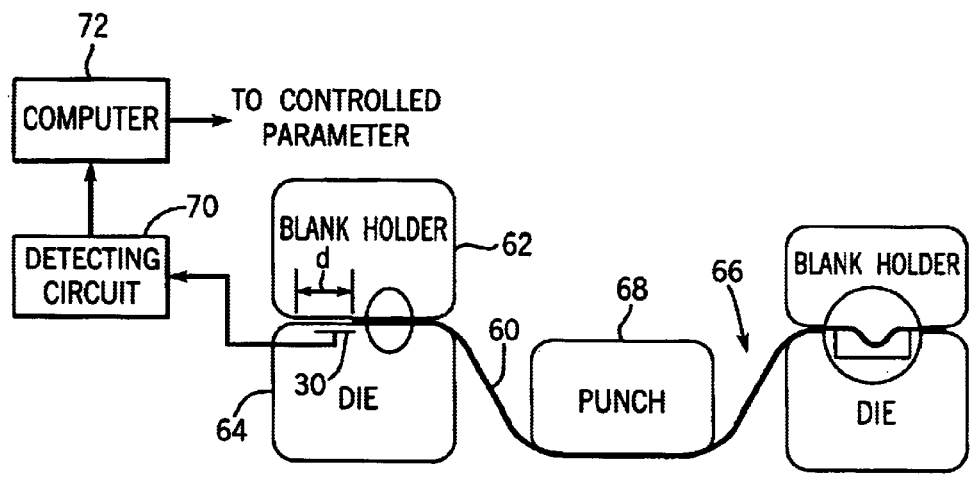
FIG. 9 is a simplified representation of the process setup for a sheet metal forming process incorporating a sensing element in accordance with the invention.

Referring to FIG. 9 which is a simplified representation of a sheet metal forming process in accordance with the invention, the present invention provides real-time measurements of draw-in amount in a metal forming process. In such process, a blank of sheet metal 60, held in place between a blank holder 62 and a die 64 of a sheet metal forming apparatus, is drawn into a deformation zone 66 of the forming apparatus by a punch or die 68. The method includes locating one or more sensing elements, such as sensing element 30, on the die 64 and monitoring the sensing element 30 using suitable electronic circuitry.

The electronic circuitry associated with this invention can be that of the prior art or modified as required. In one preferred embodiment, the electronic circuitry includes a synchronous detector circuit 70 (a.k.a. phase sensitive amplifier) known in the art, having a voltage gain of about 100,000 and an operating frequency of typically about 50 kHz. Such figures are preferred but could vary. In accordance therewith, the sensing element is excited by an excitation current at the operating frequency of the detector circuit. Preferably, the magnitude of the excitation current is about 100 milliamps. The frequency of the excitation current is the same as the operating frequency of the detector circuit. These figures, particularly the 100 mA for the excitation current, can be smaller for a microfabricated device.

As described above and shown in FIGS. 2–3, the sensing element 30 includes a first coil 34 and a second coil 35 disposed in signal coupling relationship with the first coil. In one embodiment, the detector circuit 70 is connected to the sensing element by four wires. Two of the wires 36 and 37 are connected between an output of the detector circuit 70 and one coil 34 of the sensing element 30 for applying the excitation current to coil 34 of the sensing element. The excitation signal applied to coil 34 induces a signal in the coil 35. The signal induced in coil 35, which is the sensor response signal for the sensing element 30. The wires 38 and 39 connect the coil 35 of sensing element 30 to an input of the detector circuit 70 for coupling the response signal produced by the sensing element to the detector circuit 70. It is apparent that alternatively, coil 35 can be connected to the output of the detector circuit and the excitation can be applied to coil 35 with coil 34 being connected to the input of the detector circuit.

The response signal is related to the extent of coverage of the sensing element 30 by the edge of the metal plate 60 being formed. The degree of coverage of the sensing element 30 by the metal plate 60 changes the degree of coupling, continuously varying the coupling, systematically in direct correspondence with the amount of displacement of the metal plate relative to the sensing element. The degree of coupling can vary linearly or the coils can be oddly shaped to make the coupling vary non-linearly. The detector circuit 70 demodulates the response signal and produces an output, such as an analog DC signal, which can be conveyed to a computer or process controller 72. The computer 72 can respond to the feedback signal to control a parameter of the forming process, as indicated at 74, as a function of the amount of retreat of an edge of the sheet metal blank into the deformation zone. Alternatively, the response signal produced by the detecting circuit 70 can be monitored and/or an output produced by the computer 72 can be used to provide an indication of an adjustment that is required, and such adjustment can be made manually by a person overseeing the metal forming process.

Figure 10:
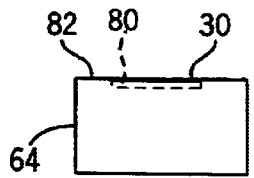
FIG. 10 is a view of a tool showing one arrangement for mounting the sensing element on a tool.

Referring to FIG. 10, in one embodiment, the sensing element 30 is located in a groove 80 in the surface 82 of the die 64 such that the sensing element 30 can be recessed with respect to the outer surface of the die. The metal plate 60 (FIG. 9) being pressed is not forced into the groove and will not crush or otherwise damage the sensing element. As described herein, the sensing element 30 can be made small in size, typically several cm long, but very narrow, less than 1 mm. As the groove 80 can also be quite small, the sensing element 30 will have a de minimus effect on the pressing operation. Alternatively, the groove 80 can be filled, encapsulating the sensing element 30 located therein and providing a smooth tooling surface. Alternatively, the sensing element can be coated with a resilient coating to prevent damage to the sensing element from the full brunt of pressing forces.

Figure 11:
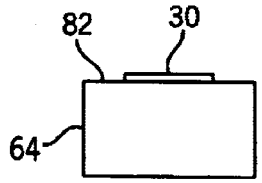
FIG. 11 illustrates an alternative mounting arrangement for the sensing element on a tool.

Referring to FIG. 11, the sensing element 30 of this invention can have thin (less than 0.1 mm) conductive patterns, such that in preferred embodiments, the sensing element 30 having conductive patterns on a polymer film 32 can be applied to the surface 82 of the die 64 in the form of a "tape-on sensor". The sensing element 30 can be replaced as often as necessary, even after every pressing operation if need be.

Figure 12:
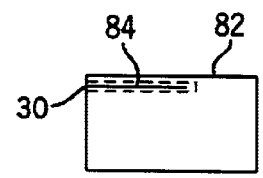
FIG. 12 illustrates a further mounting arrangement for the sensing element on a tool.

Referring to FIG. 12, utilizing this invention, a slit 84 can be made in the tooling, such as die 64, just under the surface 82, allowing the sensing element 30 to be slipped into the slit 84 so as not to be exposed on the surface 82 the die. By maintaining the amount of die material overlying the sensing element sufficiently thin, the sensing element 30 can interact magnetically with the metal plate 60 being pressed, despite the intervening thin layer of tooling material.

Referring to FIGS. 10–12, the sensors can be applied to both the die and blankholder at the same location. This arrangement is beneficial when the sheet metal being formed wrinkles between the two tooling surfaces.

Figure 13:
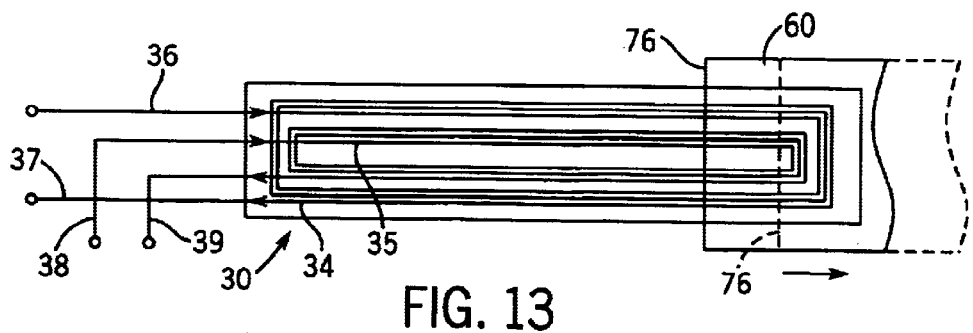
FIG. 13 is a view showing movement of a metal plate relative to the sensing element during a forming operation.

Referring to FIGS. 2 and 13, the unique configuration of the sensing element 30 of this invention, a pair of long rectangular coils 34 and 35, interspersed or otherwise near each other, is advantageously used in determining amount of coverage of the sensing element 30 by a metal element, such as a metal plate 60 being formed. The presence of metal (ferrous or non-ferrous) near the coils affects the magnetic field lines, changing the degree of mutual inductance (magnetic coupling) from one coil to the other coil. Thus, the response signal reflects how much of the coil pair of sensing element 30 is covered up. FIG. 13 illustrates the sensing element 30 and the edge 76 of metal plate 60 (only a portion of which is shown in FIG. 13) being formed and sliding through the binders, such as blank holder 62 and die 64, relative to the coil pair 34 and 35 of the sensing element 30 to a draw-in position which is indicated by the dashed line in FIG. 13, in which the edge of the metal plate 60 overlies a smaller portion of the sensing element 30, so that a smaller portion of the sensing element 30 is "covered" by the metal plate 60. With a smaller portion of the sensing element 30 is "covered" by the metal plate 60, the amplitude of the response signal is increased. As will be shown, the change in the amplitude of the response signal varies substantially linearly with the distance that metal piece 60 travels with the respect to the sensing element 30.

Although only a single sensing element 30 is illustrated in FIG. 9, it will be understood that a plurality of sensing elements 30 can be used in a given metal forming apparatus. For example, in the case where the metal plate is rectangular in shape, eight sensing elements 30 could be employed, one adjacent to each side of the metal sheet and one at each corner. Sensing elements 30 can be placed at as many locations where local material flow information is needed. Also, for a given part formed by a multi-stage forming operation, one or more sensing elements could be located in different forming apparatus at different forming stages, with the results of the sensing for successive forming stages being supplied to the control computer which can produce a running data indicating the overall accuracy of the forming process for that part, providing a go/no-go monitoring function for the overall process.

Figure 14:
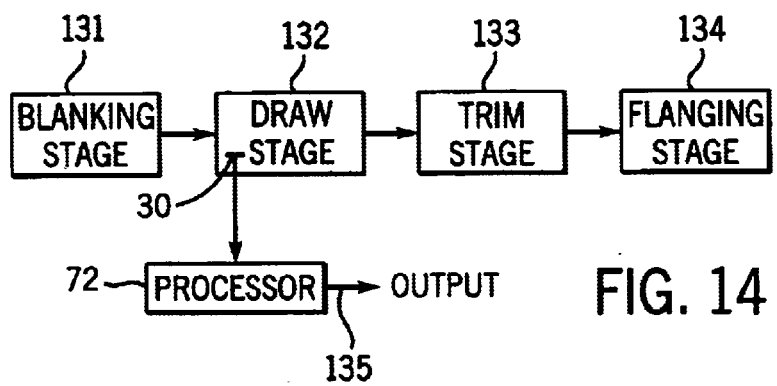
FIG. 14 is a block diagram of a multi-stage sheet metal forming process incorporating one or more draw-in sensors provided by the invention in one of the forming stages.

For example, with reference to FIG. 14, in one application, the draw-in sensor 30 provided by the present invention is incorporated into a typical multi-stage sheet metal forming process which includes a single draw stage. The first stage of the process is a blanking stage 131. The second stage of the process 132 is the draw stage. The third stage of the process 133 is a trim stage. The fourth stage 134 of the process is a flanging stage. The draw stage 132 includes one or more draw in sensors 30 for providing to a processor or computer 72 signals indicative of the amount of material draw-in for a part being formed at draw stage 132. When the draw-in amount is excessive, the processor 72 can produce a rejection signal 135, indicating that such part should be rejected.

Figure 15:
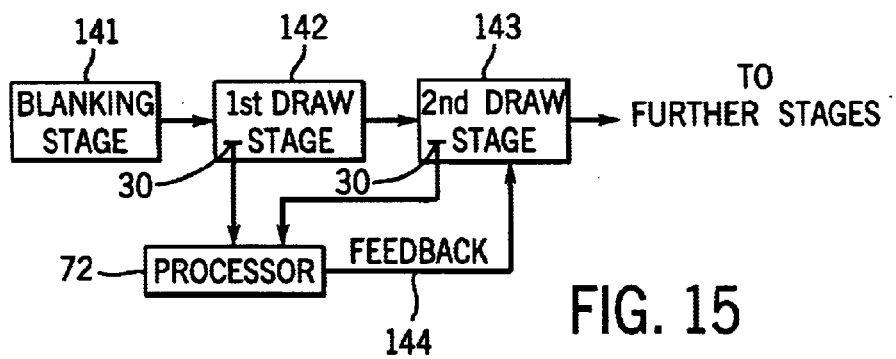
FIG. 15 is a block diagram of a multi-stage sheet metal forming process incorporating one or more draw-in sensors provided by the invention at different forming stages; and, FIG. 16 is a graph illustrating the magnitude of the voltage output of the sensor system as a function of displacement of a metal plate across the sensing element for metal plates of different materials.

Referring to FIG. 15, in another application, the draw-in sensor 30 provided by the present invention is incorporated into a multi-stage sheet metal forming process which includes a plurality of draw stages necessary for forming a more complex part. The first stage 141 of the process is a blanking stage. The second stage 142 of the process is a first draw stage. The third stage of the process 143 is a second draw stage. The process can include one or more further stages (not shown) following the second draw stage 143. The first draw stage 142 includes one or more draw-in sensors 30 for providing signals to a processor or computer 72 indicative of the amount of material draw-in for a part being formed at draw stage 142. Draw stage 143 also can include one or more draw-in sensors 30. When the draw-in amount is excessive or not sufficient, as indicated by the signals produced by the draw-in sensors 30 in stage 142, the processor 72 can generate a feedback signal 144 to direct how one or more process parameters are adjusted at a further stage, such as the second draw stage 143, to compensate for the incorrect draw-in amount that occurred at the first draw stage 142.

As mentioned above, various benefits and advantages are achieved through the present invention. Low cost is achieved because the sensing element 30 is merely a conductive pattern on a thin polymer film, and can be fabricated by printed circuit techniques or lithographic techniques. The sensing element structure, placement and configuration provide other benefits relating to durability and overall usefulness. For instance, the sensing element 30 does not have to touch the metal plate being formed. The sensing element 30 interacts with the metal plate remotely (from a distance of up to a few millimeters). Durability and ruggedness are enhanced by virtue of the use of a non-contacting sensing element. The sensing element 30 can be made very flat.

The following non-limiting examples and data illustrate various aspects and features relating to the sensor systems/sensing elements and/or methods of the present invention, including the fabrication and use of sensing elements designed and configured as elsewhere provided herein.

Figure 16:
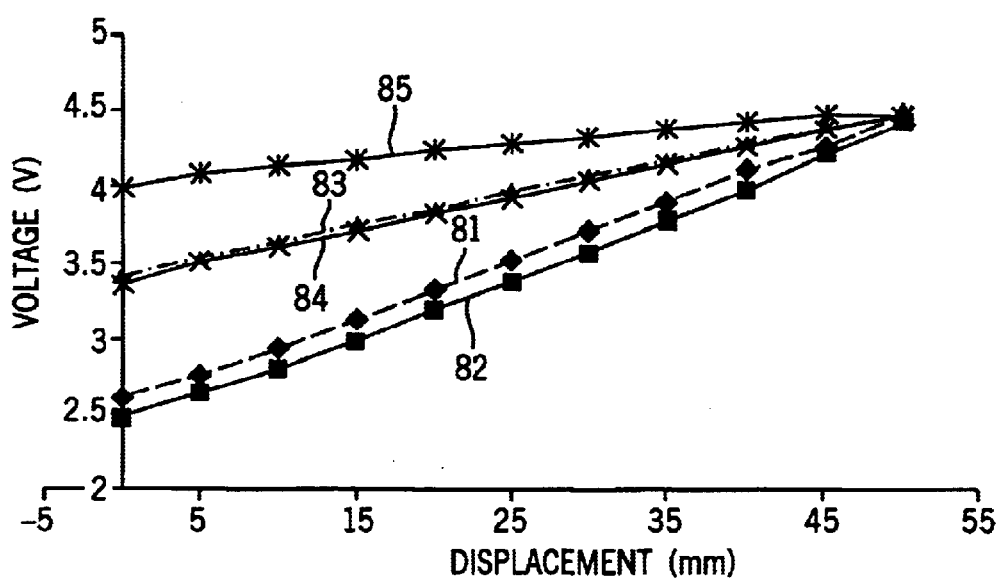

Referring to FIG. 16, curves 81–85 illustrate the change in the amplitude of the voltage output, or sensor response signal, of the sensor system as a function of displacement of metal test plates across the sensing element 30 for a variety of metal test plates of different materials. The left side of the curves for each test plate represents the output voltage when the metal test plate is overlying the sensing element. The right side of the curves represents the output voltage when the metal test plate has been moved away from its position overlying the sensing element. Curve 81 represents the output provided for a sheet of aluminum having a thickness of 2.08 mm. Curve 82 represents the output provided for a sheet of aluminum having a thickness of 1.04 mm. Curve 83 represents the output provided for a sheet of electro-galvanized steel having a thickness of 0.88 mm. Curve 84 represents the output provided for a sheet of electro-galvanized steel having a thickness of 0.76 mm. Curve 85 represents the output provided for a sheet of plain steel having a thickness of 0.60 mm. For all five examples, the output voltage varies substantially linearly for displacement, showing the linear relationship of the detector output as a function of displacement of a metal plate across the sensing element. However, the change in signal strength is greater for aluminum than steel as can be seen by comparing curves 81 and 82 with curve 85. Moreover, the change in signal strength is greater for electro-galvanized steel plate, curves 83 and 84 than that produced for a steel plate 85, but is less than that produced for aluminum plates, curves 81 and 82.

Figure 17:
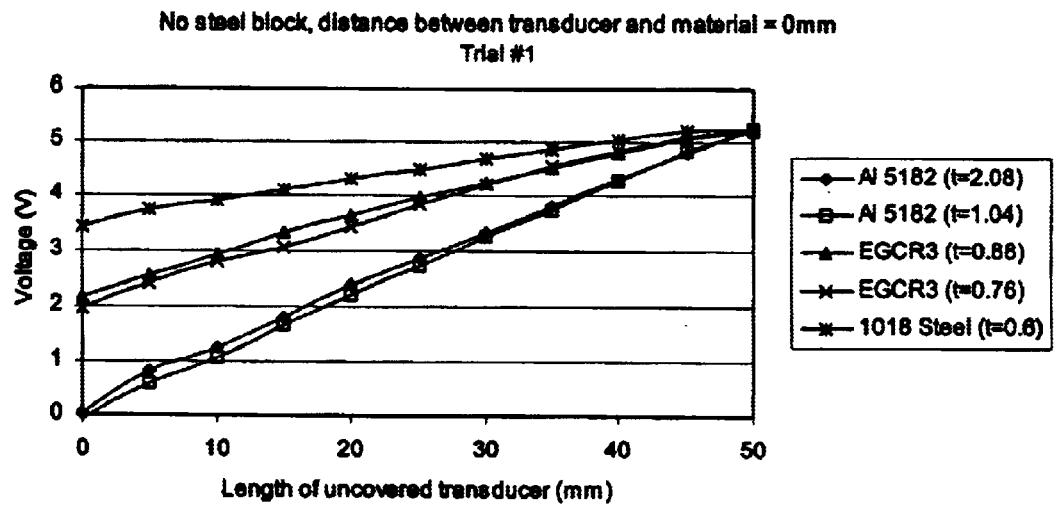
FIGS. 17–34 are graphs illustrating the magnitude of the voltage output of the sensor system as a function of displacement of a metal plate across the sensing element for metal plates of different materials under various test conditions.
Figure 18:
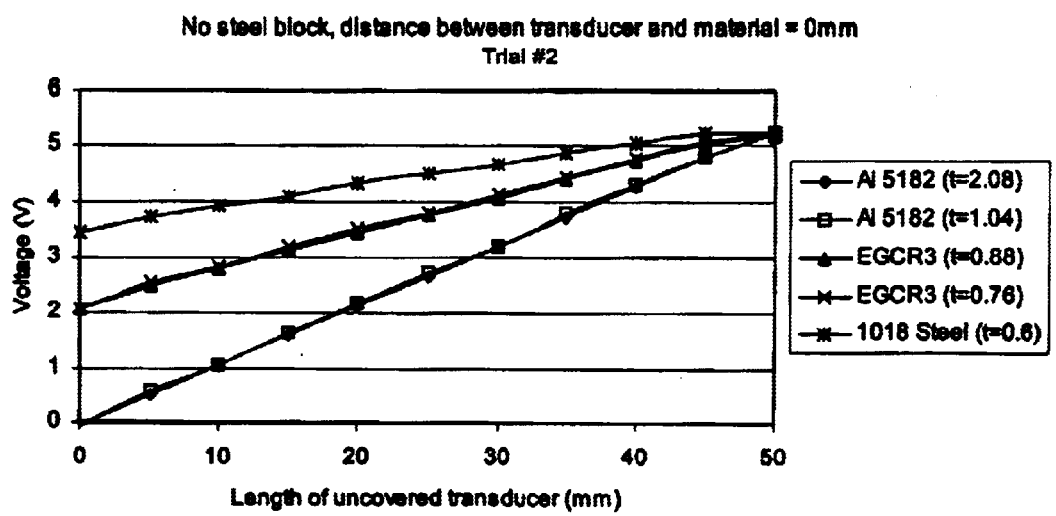
Figure 19:
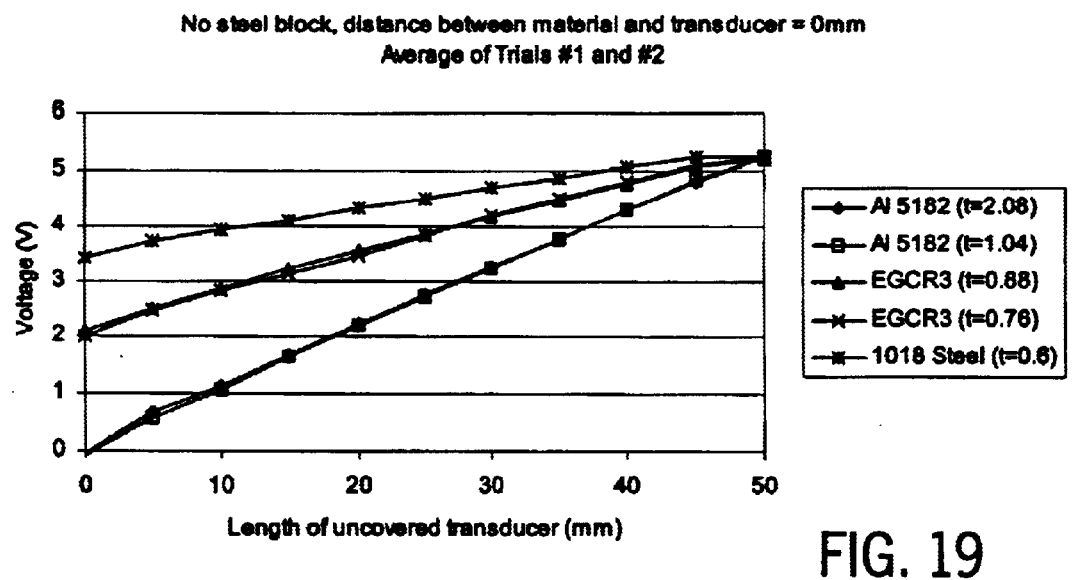
Figure 20:
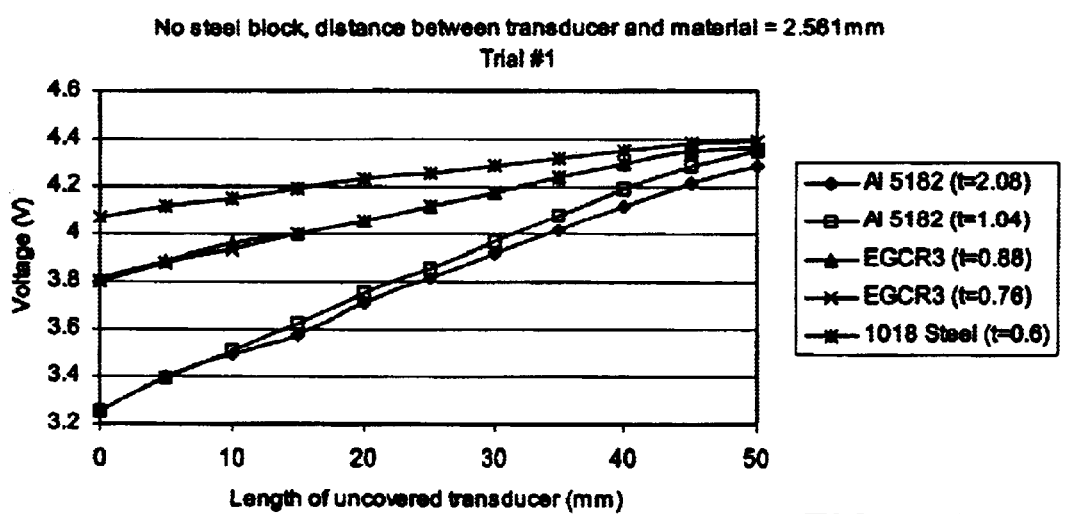
Figure 21:
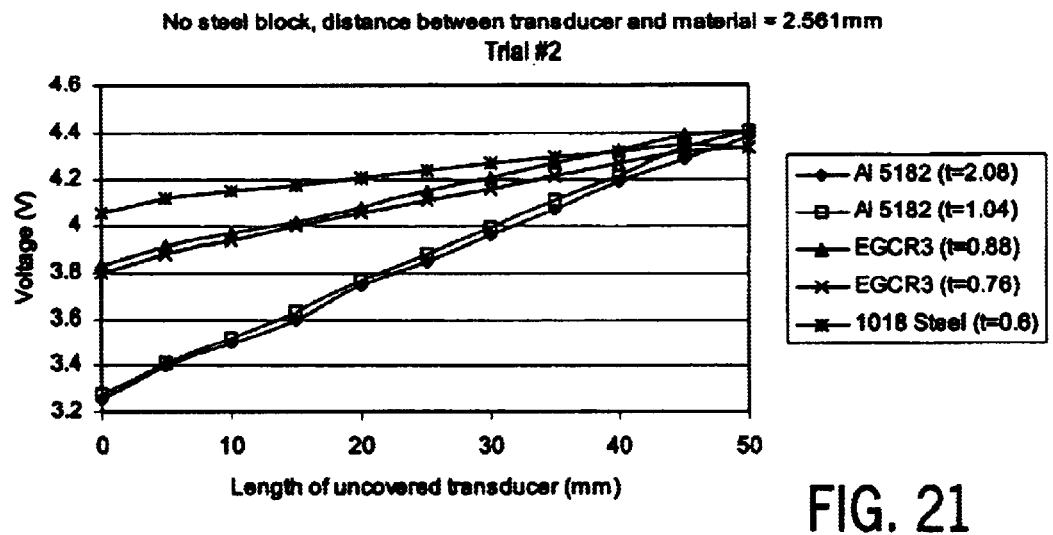
Figure 22:
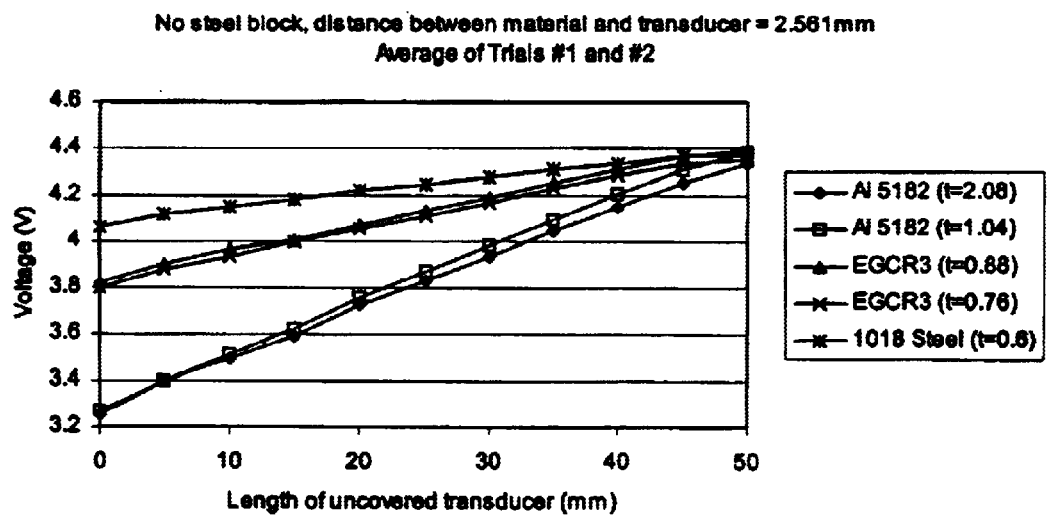

The graphs in FIGS. 17–19 also illustrate the change in the amplitude of the voltage output, or sensor response signal, of the sensor system as a function of displacement of metal test plates or sheets across the sensing element 30 for the five metal test plates used for the tests described above with reference to FIG. 16 and having the same thicknesses as those test plates. The tests were conducted without a metal block simulating a lower (and/or upper) binder, and with no spacing between the sensing element, or transducer, and the metal test plate. FIGS. 17 and 18 illustrate the results of two trials and FIG. 19 illustrates the average of the two trials. Again, the left side of the curves for each metal test plate represents the output voltage when the metal test plate is overlying the sensing element. The right side of the curves represents the output voltage when the metal test plate has been moved away from its position overlying the sensing element. For all five examples, the output voltage varies substantially linearly for displacement, showing the linear relationship of the detector output as a function of displacement of a metal plate across the sensing element. However, the change in signal strength is greater for aluminum than steel as can be seen by comparing respective curves for these test plates. Moreover, as is the case illustrated in FIG. 16, the change in signal strength is greater for electro-galvanized steel plate than that produced for a steel plate, but is less than that produced for aluminum plates. In addition, the test results indicate the repeatability of the measurement of the change in signal strength. The test data for the test results illustrated in FIGS. 17–19 is given in TABLE I in Appendix I. FIGS. 20–22 illustrate test results for a further series of tests using the five metal plates and under test conditions described above with respect to the test results illustrated in FIGS. 17–19, except that there was a separation of 2.561 mm between the sensing element and the metal test plates. Again, FIGS. 20 and 21 illustrate the results of two trials and FIG. 22 illustrates the average of the two trials. The test data for the test results illustrated in FIGS. 20–22 is given in TABLE II (Appendix I).

Figure 23:
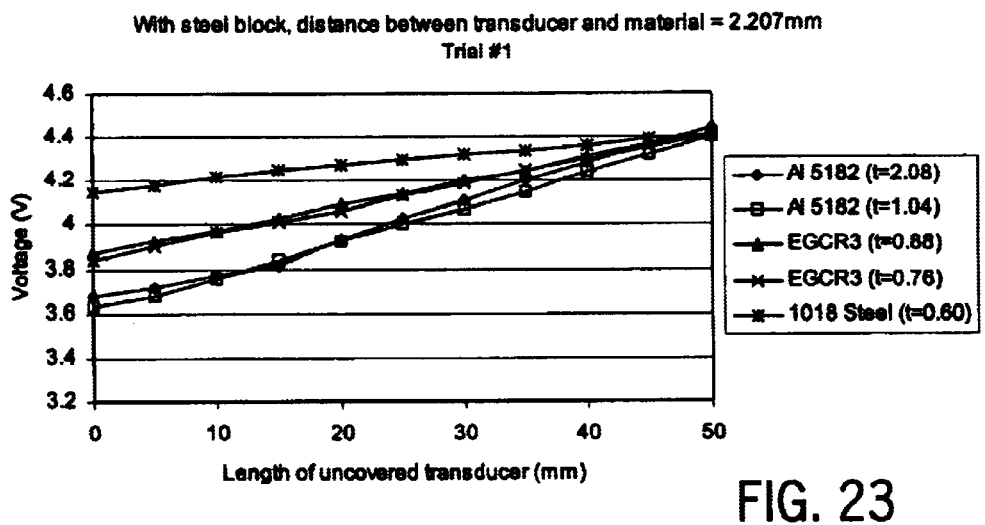
Figure 24:
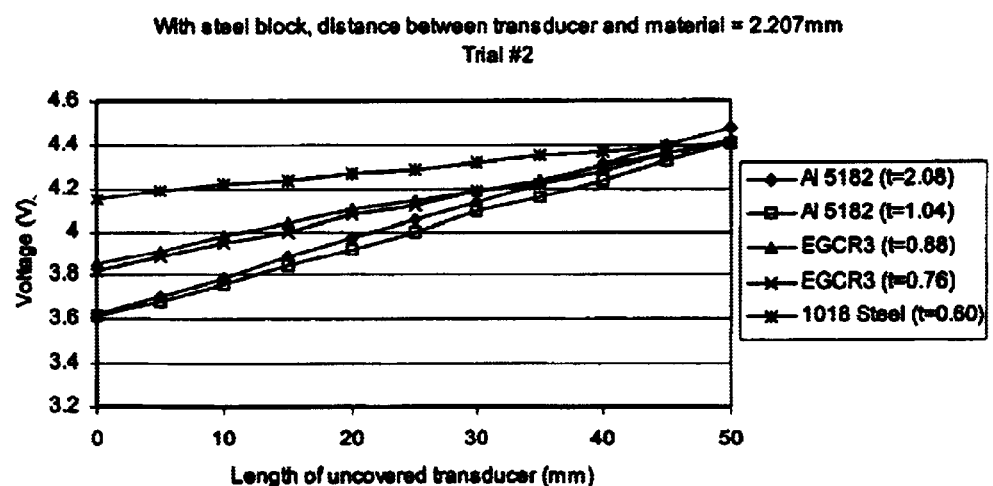
Figure 25:
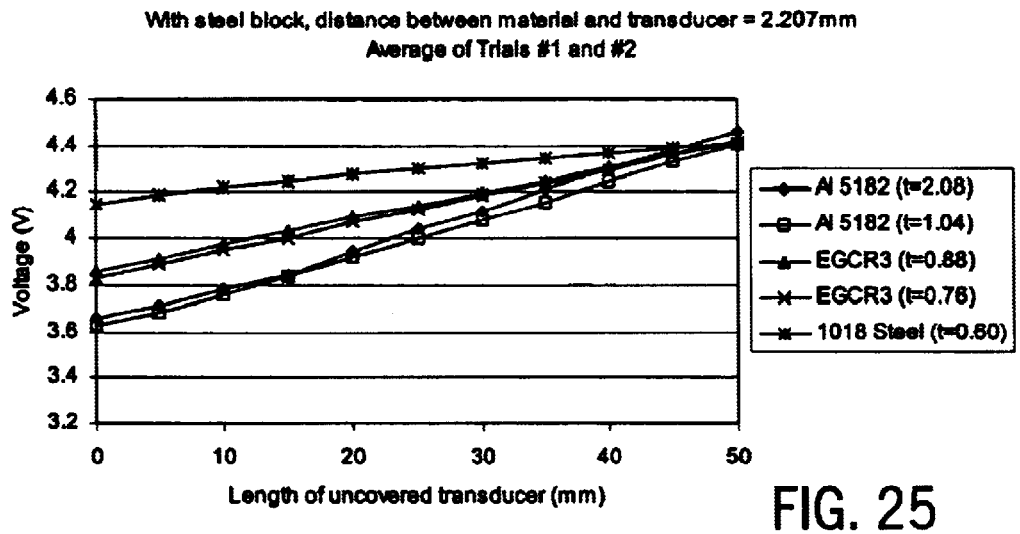
Figure 26:
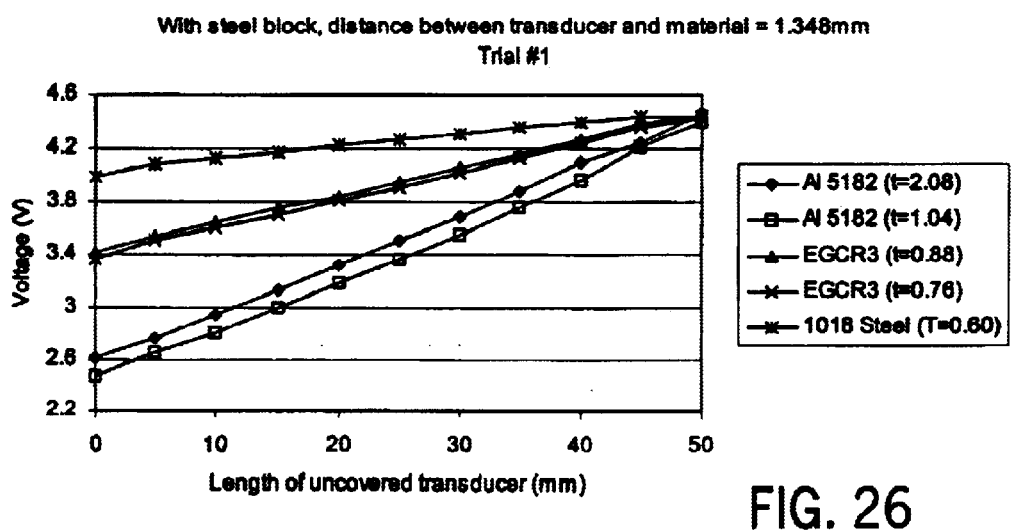
Figure 27:
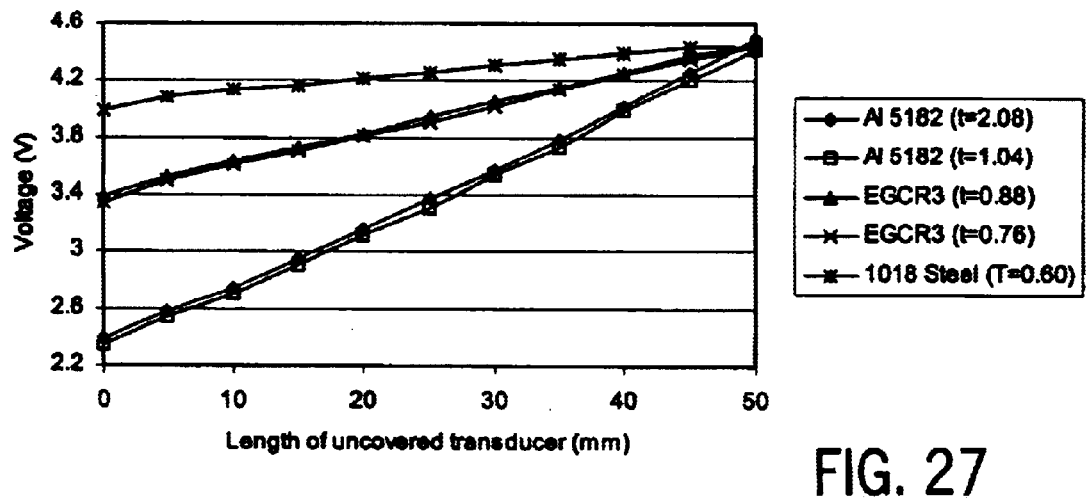
Figure 28:
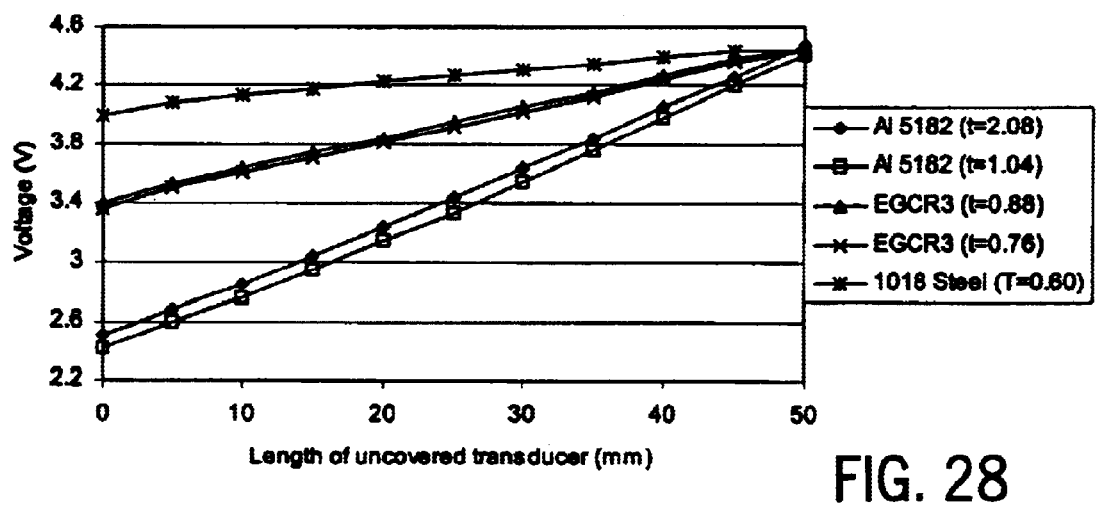

FIGS. 23–25 illustrate test results for a further series of tests using the five metal plates and under test conditions described above with respect to the test results illustrated in FIGS. 17–19, except that a steel block was located in the proximity of the sensing element to simulate a lower or upper binder, and there was a separation of 2.207 mm between the sensing element and the metal test plates. Again, FIGS. 23 and 24 illustrate the results of two trials and FIG. 25 illustrates the average of the two trials. The test data for the test results illustrated in FIGS. 23–25 is given in TABLE III (Appendix I). FIGS. 26–28 illustrate test results for a further series of tests using the five metal plates and under test conditions described above with respect to the test results illustrated in FIGS. 23–25, the separation between the sensing element and the metal plates was 1.348 mm. The test data for the test results illustrated in FIGS. 26–28 is given in TABLE IV (Appendix I).

Figure 29:
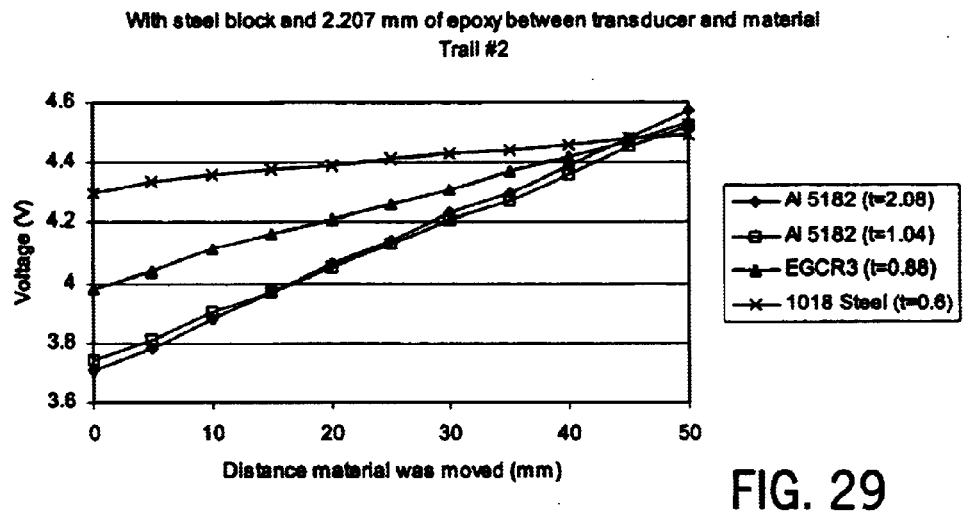
Figure 30:
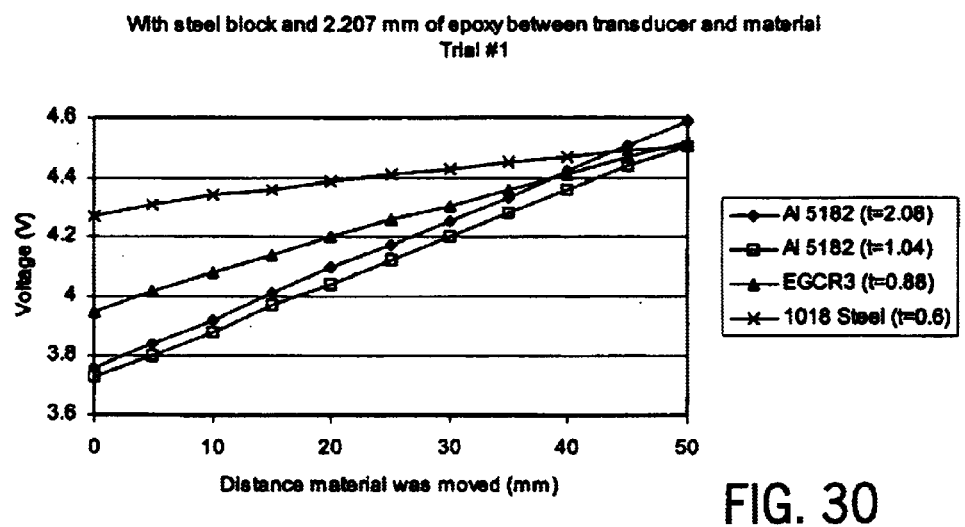
Figure 31:
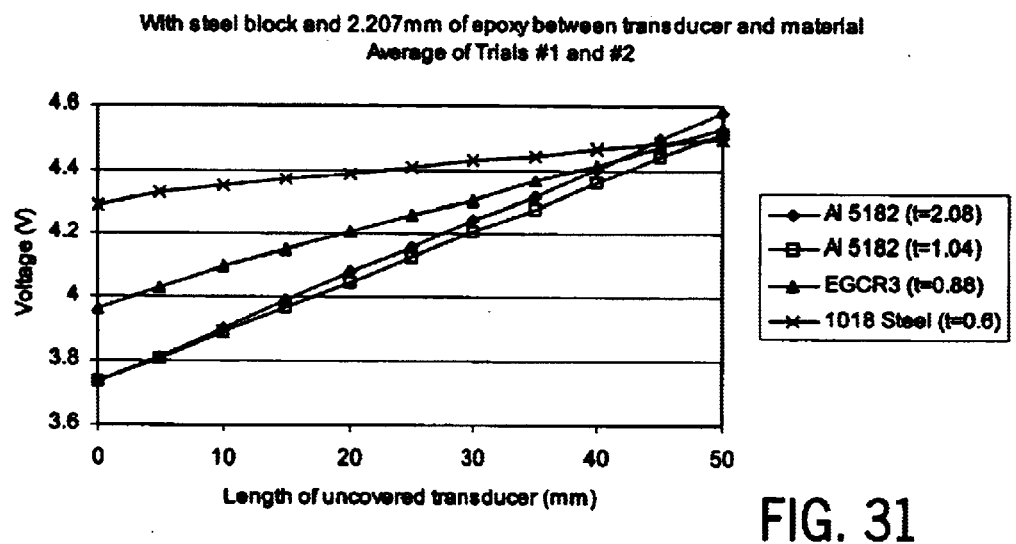

FIGS. 29–31 illustrate test results for a further series of tests using four of the five metal plates and under test conditions described above with respect to the test results illustrated in FIGS. 20–22, except that layer of epoxy, 2.207 mm thick, was interposed between the sensing element and the metal plates. Again, FIGS. 29 and 20 illustrate the results of two trials and FIG. 31 illustrates the average of the two trials. The test data for the test results illustrated in FIGS. 29–31 is given in TABLE V (Appendix I).

Figure 32:
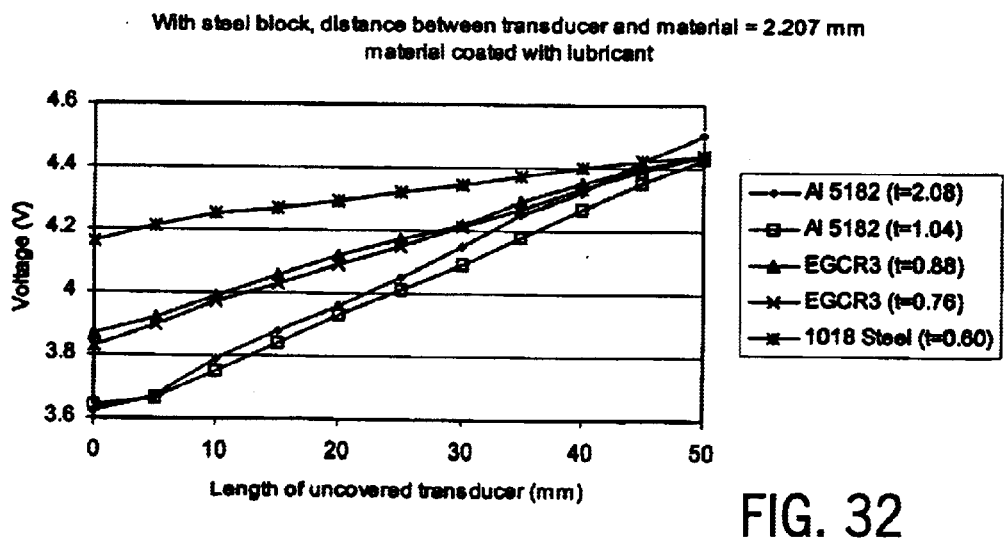

FIG. 32 illustrates test results for a further series of tests using four of the five metal plates and under test conditions described above with respect to the test results illustrated in FIGS. 20–22, except that the metal plates were coated with a layer of lubricant. The test data for the test results illustrated in FIG. 32 is given in TABLE VI (Appendix I).

Figure 33:
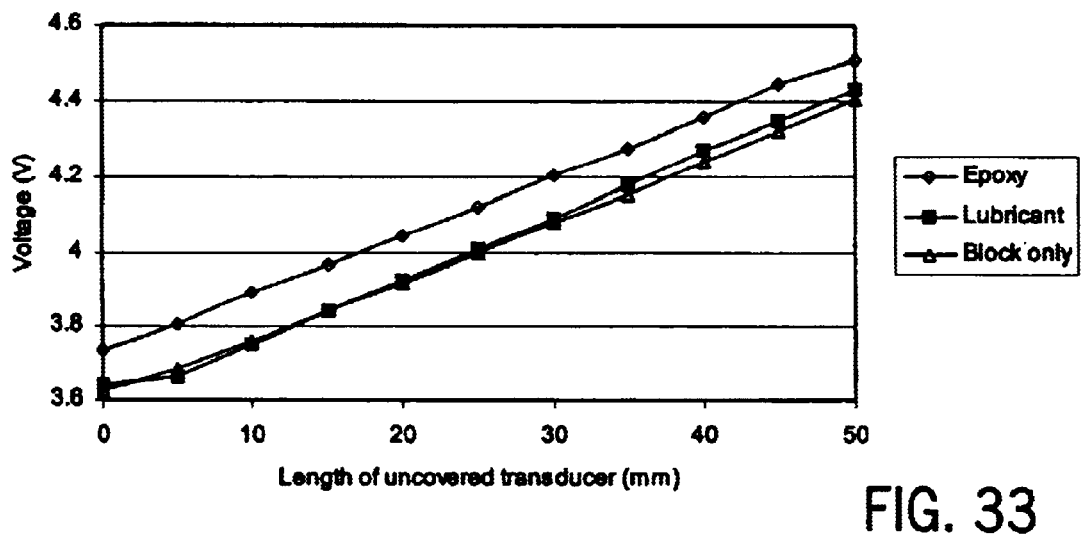
Figure 34:
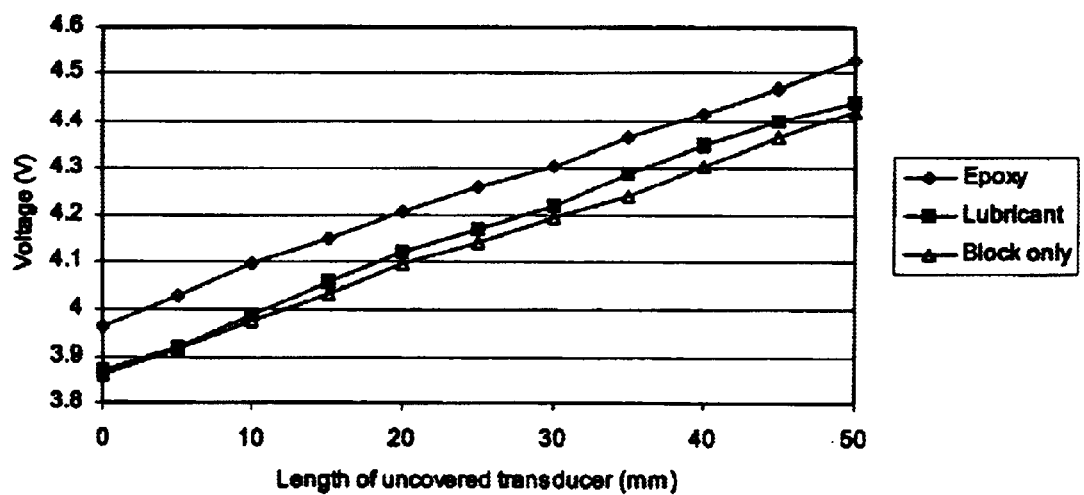

FIG. 33 illustrates test results for a further series of tests using a sheet of aluminum (5182) having a thickness of 1.04 mm under the conditions described above with respect to FIGS. 23–25 wherein a steel block, simulating a lower or upper binder, was located in the proximity of the sensing element. There was a separation of 2.207 mm between the sensing element and the metal test plates. For one test, a layer of epoxy was interposed between the sensing element and the test plate. For another test, the test plate was coated with a lubricant. For a third test, a steel block only. The test data for the test results illustrated in FIG. 33 is given in TABLE VII (Appendix I). A similar series of tests was run using a sheet of electro-galvanized steel having a thickness of 0.88 mm. The test results are illustrated in FIG. 34. The test data for the test results illustrated in FIG. 34 is given in TABLE VIII (Appendix I).

The present devices and elements provide results which are surprising, unexpected and contrary to the prior art. While the utility of this invention can be illustrated through the use of several preferred devices/sensing elements, it will be understood by those skilled in the art that comparable results are obtainable with various other sensor/element configurations and designs, such configurations and designs as can be used in conjunction with various sensor systems, devices, and sheet metal forming apparatus, commensurate with the scope of this invention While the principles of this invention have been described in connection with specific embodiments, it should be understood clearly that these descriptions are provided only by way of example and are not intended to limit, in any way, the scope of this invention. Other advantages, features and benefits will become apparent from the claims filed hereafter, with the scope thereof as would be determined by their reasonable equivalents, as understood by those skilled in the art.

Appendix I

TABLE I
NO BLOCK TESTS:

| Trial #1 uncovered (mm) | no distance between material and transducer | | | |
|---|---|---|---|---|
| | Al 5182 (t=2.08) | Al 5182 (t=1.04) | EGCR3 (t=0.88) | EGCR3 (t=0.76) | 1018 Steel (t=0.6) |
| 0 | 0.029 | -0.064 | 2.15 | 1.961 | 3.43 |
| 5 | 0.825 | 0.586 | 2.551 | 2.385 | 3.73 |
| 10 | 1.222 | 1.07 | 2.927 | 2.769 | 3.91 |
| 15 | 1.77 | 1.642 | 3.31 | 3.066 | 4.11 |
| 20 | 2.355 | 2.207 | 3.65 | 3.42 | 4.32 |
| 25 | 2.86 | 2.712 | 3.97 | 3.84 | 4.49 |
| 30 | 3.32 | 3.24 | 4.25 | 4.23 | 4.69 |
| 35 | 3.82 | 3.75 | 4.53 | 4.55 | 4.86 |
| 40 | 4.31 | 4.3 | 4.81 | 4.84 | 5.05 |
| 45 | 4.81 | 4.84 | 5.09 | 5.12 | 5.22 |
| 50 | 5.23 | 5.25 | 5.21 | 5.23 | 5.23 |

| Trial #2 uncovered (mm) | no distance between material and transducer | | | | |
|---|---|---|---|---|---|
| | Al 5182 (t=2.08) | Al 5182 (t=1.04) | EGCR3 (t=0.88) | EGCR3 (t=0.76) | 1018 Steel (t=0.6) |
| 0 | -0.071 | -0.066 | 2.073 | 2.086 | 3.44 |
| 5 | 0.517 | 0.579 | 2.488 | 2.543 | 3.73 |
| 10 | 1.04 | 1.073 | 2.798 | 2.836 | 3.91 |
| 15 | 1.586 | 1.633 | 3.14 | 3.1295 | 4.1 |
| 20 | 2.163 | 2.189 | 3.45 | 3.5 | 4.32 |
| 25 | 2.667 | 2.714 | 3.76 | 3.8 | 4.49 |
| 30 | 3.2 | 3.22 | 4.07 | 4.12 | 4.67 |
| 35 | 3.71 | 3.78 | 4.41 | 4.44 | 4.86 |
| 40 | 4.26 | 4.31 | 4.74 | 4.77 | 5.04 |
| 45 | 4.79 | 4.82 | 5.06 | 5.08 | 5.21 |
| 50 | 5.21 | 5.23 | 5.18 | 5.22 | 5.23 |

| Average uncovered (mm) | no distance between material and transducer | | | | |
|---|---|---|---|---|---|
| | Al 5182 (t=2.08) | Al 5182 (t=1.04) | EGCR3 (t=0.88) | EGCR3 (t=0.76) | 1018 Steel (t=0.6) |
| 0 | -0.021 | -0.065 | 2.1115 | 2.0235 | 3.435 |
| 5 | 0.671 | 0.5825 | 2.5195 | 2.464 | 3.73 |
| 10 | 1.131 | 1.0715 | 2.8625 | 2.8025 | 3.91 |
| 15 | 1.678 | 1.6375 | 3.225 | 3.1295 | 4.105 |
| 20 | 2.259 | 2.198 | 3.55 | 3.46 | 4.32 |
| 25 | 2.7635 | 2.713 | 3.865 | 3.82 | 4.49 |
| 30 | 3.26 | 3.23 | 4.16 | 4.175 | 4.68 |
| 35 | 3.765 | 3.765 | 4.47 | 4.495 | 4.86 |
| 40 | 4.285 | 4.305 | 4.775 | 4.805 | 5.045 |
| 45 | 4.8 | 4.83 | 5.075 | 5.1 | 5.215 |
| 50 | 5.22 | 5.24 | 5.195 | 5.225 | 5.23 |

TABLE II

| Trial #1 uncovered (mm) | distance between material and transducer = 2.561mm | | | | |
|---|---|---|---|---|---|
| | Al 5182 (t=2.08) | Al 5182 (t=1.04) | EGCR3 (t=0.88) | EGCR3 (t=0.76) | 1018 Steel (t=0.6) |
| 0 | 3.26 | 3.26 | 3.82 | 3.8 | 4.07 |
| 5 | 3.4 | 3.39 | 3.89 | 3.88 | 4.12 |
| 10 | 3.5 | 3.51 | 3.96 | 3.94 | 4.15 |
| 15 | 3.58 | 3.62 | 4 | 4 | 4.19 |
| 20 | 3.71 | 3.75 | 4.06 | 4.06 | 4.23 |
| 25 | 3.82 | 3.86 | 4.12 | 4.12 | 4.26 |
| 30 | 3.92 | 3.97 | 4.18 | 4.18 | 4.29 |
| 35 | 4.02 | 4.08 | 4.24 | 4.24 | 4.32 |
| 40 | 4.12 | 4.19 | 4.3 | 4.3 | 4.35 |
| 45 | 4.22 | 4.29 | 4.35 | 4.35 | 4.38 |
| 50 | 4.29 | 4.35 | 4.37 | 4.36 | 4.39 |

| Trial #2 uncovered (mm) | distance between material and transducer = 2.561 | | | | |
|---|---|---|---|---|---|
| | Al 5182 (t=2.08) | Al 5182 (t=1.04) | EGCR3 (t=0.88) | EGCR3 (t=0.76) | 1018 Steel (t=0.6) |
| 0 | 3.26 | 3.28 | 3.83 | 3.8 | 4.06 |
| 5 | 3.4 | 3.41 | 3.91 | 3.88 | 4.12 |
| 10 | 3.5 | 3.52 | 3.97 | 3.94 | 4.15 |
| 15 | 3.6 | 3.63 | 4.02 | 4 | 4.18 |
| 20 | 3.74 | 3.77 | 4.08 | 4.06 | 4.21 |
| 25 | 3.85 | 3.88 | 4.15 | 4.11 | 4.24 |
| 30 | 3.96 | 3.99 | 4.21 | 4.16 | 4.27 |
| 35 | 4.07 | 4.11 | 4.27 | 4.22 | 4.3 |
| 40 | 4.19 | 4.22 | 4.33 | 4.27 | 4.32 |
| 45 | 4.29 | 4.34 | 4.39 | 4.32 | 4.35 |
| 50 | 4.38 | 4.41 | 4.41 | 4.34 | 4.34 |

| Average uncovered (mm) | distance between material and transducer = 2.561 | | | | |
|---|---|---|---|---|---|
| | Al 5182 (t=2.08) | Al 5182 (t=1.04) | EGCR3 (t=0.88) | EGCR3 (t=0.76) | 1018 Steel (t=0.6) |
| 0 | 3.26 | 3.27 | 3.825 | 3.8 | 4.065 |
| 5 | 3.4 | 3.4 | 3.9 | 3.88 | 4.12 |
| 10 | 3.5 | 3.515 | 3.965 | 3.94 | 4.15 |
| 15 | 3.59 | 3.625 | 4.01 | 4 | 4.185 |
| 20 | 3.725 | 3.76 | 4.07 | 4.06 | 4.22 |
| 25 | 3.835 | 3.87 | 4.135 | 4.115 | 4.25 |
| 30 | 3.94 | 3.98 | 4.195 | 4.17 | 4.28 |
| 35 | 4.045 | 4.095 | 4.255 | 4.23 | 4.31 |
| 40 | 4.155 | 4.205 | 4.315 | 4.285 | 4.335 |
| 45 | 4.255 | 4.315 | 4.37 | 4.335 | 4.365 |
| 50 | 4.335 | 4.38 | 4.39 | 4.35 | 4.365 |

TABLE III

BLOCK TESTS:

Trial #1 distance between material and transducer = 2.207mm

| uncovered (mm) | Al 5182 (t=2.08) | Al 5182 (t=1.04) | EGCR3 (t=0.88) | EGCR3 (t=0.76) | 1018 Steel (t=0.60) |
|---|---|---|---|---|---|
| 0 | 3.655 | 3.63 | 3.87 | 3.84 | 4.15 |
| 5 | 3.72 | 3.68 | 3.92 | 3.9 | 4.18 |
| 10 | 3.77 | 3.76 | 3.97 | 3.96 | 4.22 |
| 15 | 3.81 | 3.84 | 4.03 | 4.01 | 4.25 |
| 20 | 3.93 | 3.92 | 4.09 | 4.06 | 4.27 |
| 25 | 4.03 | 4 | 4.14 | 4.13 | 4.3 |
| 30 | 4.11 | 4.07 | 4.2 | 4.19 | 4.32 |
| 35 | 4.2 | 4.15 | 4.24 | 4.25 | 4.34 |
| 40 | 4.28 | 4.24 | 4.31 | 4.3 | 4.36 |
| 45 | 4.37 | 4.32 | 4.37 | 4.35 | 4.39 |
| 50 | 4.44 | 4.4 | 4.42 | 4.41 | 4.41 |

Trial #2 distance between material and transducer = 2.207mm

| uncovered (mm) | Al 5182 (t=2.08) | Al 5182 (t=1.04) | EGCR3 (t=0.88) | EGCR3 (t=0.76) | 1018 Steel (t=0.60) |
|---|---|---|---|---|---|
| 0 | 3.63 | 3.62 | 3.85 | 3.82 | 4.15 |
| 5 | 3.71 | 3.68 | 3.91 | 3.88 | 4.19 |
| 10 | 3.79 | 3.76 | 3.98 | 3.95 | 4.22 |
| 15 | 3.88 | 3.84 | 4.04 | 4 | 4.24 |
| 20 | 3.97 | 3.92 | 4.1 | 4.08 | 4.27 |
| 25 | 4.05 | 4 | 4.14 | 4.12 | 4.29 |
| 30 | 4.13 | 4.09 | 4.19 | 4.19 | 4.32 |
| 35 | 4.22 | 4.16 | 4.24 | 4.22 | 4.35 |
| 40 | 4.31 | 4.24 | 4.3 | 4.28 | 4.37 |
| 45 | 4.4 | 4.33 | 4.36 | 4.36 | 4.39 |
| 50 | 4.48 | 4.41 | 4.42 | 4.41 | 4.41 |

Average distance between material and transducer = 2.207mm

| uncovered (mm) | Al 5182 (t=2.08) | Al 5182 (t=1.04) | EGCR3 (t=0.88) | EGCR3 (t=0.76) | 1018 Steel (t=0.60) |
|---|---|---|---|---|---|
| 0 | 3.655 | 3.625 | 3.86 | 3.83 | 4.15 |
| 5 | 3.715 | 3.68 | 3.915 | 3.89 | 4.185 |
| 10 | 3.78 | 3.76 | 3.975 | 3.955 | 4.22 |
| 15 | 3.845 | 3.84 | 4.035 | 4.005 | 4.245 |
| 20 | 3.95 | 3.92 | 4.095 | 4.07 | 4.27 |
| 25 | 4.04 | 4 | 4.14 | 4.125 | 4.295 |
| 30 | 4.12 | 4.08 | 4.195 | 4.19 | 4.32 |
| 35 | 4.21 | 4.155 | 4.24 | 4.235 | 4.345 |
| 40 | 4.295 | 4.24 | 4.305 | 4.29 | 4.365 |
| 45 | 4.385 | 4.325 | 4.365 | 4.355 | 4.39 |
| 50 | 4.46 | 4.405 | 4.42 | 4.41 | 4.41 |

TABLE IV

Trial #1 distance between material and transducer = 1.348mm

| uncovered (mm) | Al 5182 (t=2.08) | Al 5182 (t=1.04) | EGCR3 (t=0.88) | EGCR3 (t=0.76) | 1018 Steel (T=0.60) |
|---|---|---|---|---|---|
| 0 | 2.607 | 2.478 | 3.42 | 3.36 | |
| 5 | 2.765 | 2.648 | 3.54 | 3.51 | 4.09 |
| 10 | 2.938 | 2.805 | 3.65 | 3.61 | 4.14 |
| 15 | 3.13 | 2.99 | 3.76 | 3.71 | 4.18 |
| 20 | 3.32 | 3.19 | 3.85 | 3.82 | 4.23 |
| 25 | 3.51 | 3.37 | 3.96 | 3.92 | 4.27 |
| 30 | 3.7 | 3.56 | 4.06 | 4.03 | 4.31 |
| 35 | 3.89 | 3.77 | 4.16 | 4.13 | 4.36 |
| 40 | 4.1 | 3.97 | 4.27 | 4.25 | 4.41 |
| 45 | 4.25 | 4.21 | 4.39 | 4.36 | 4.45 |
| 50 | 4.47 | 4.42 | 4.46 | 4.44 | 4.45 |

Trial #2 distance between material and transducer = 1.348mm

| uncovered (mm) | Al 5182 (t=2.08) | Al 5182 (t=1.04) | EGCR3 (t=0.88) | EGCR3 (t=0.76) | 1018 Steel (T=0.60) |
|---|---|---|---|---|---|
| 0 | 2.396 | 2.354 | 3.39 | 3.35 | 3.99 |
| 5 | 2.58 | 2.538 | 3.52 | 3.5 | 4.08 |
| 10 | 2.748 | 2.71 | 3.63 | 3.6 | 4.13 |
| 15 | 2.953 | 2.913 | 3.73 | 3.7 | 4.17 |
| 20 | 3.16 | 3.12 | 3.82 | 3.81 | 4.22 |
| 25 | 3.37 | 3.31 | 3.94 | 3.91 | 4.26 |
| 30 | 3.57 | 3.53 | 4.05 | 4.02 | 4.31 |
| 35 | 3.78 | 3.73 | 4.15 | 4.13 | 4.35 |
| 40 | 4.02 | 3.98 | 4.26 | 4.25 | 4.4 |
| 45 | 4.26 | 4.2 | 4.38 | 4.36 | 4.44 |
| 50 | 4.49 | 4.42 | 4.44 | 4.44 | 4.44 |

Average distance between material and transducer = 1.348mm

| uncovered (mm) | Al 5182 (t=2.08) | Al 5182 (t=1.04) | EGCR3 (t=0.88) | EGCR3 (t=0.76) | 1018 Steel (T=0.60) |
|---|---|---|---|---|---|
| 0 | 2.5015 | 2.416 | 3.405 | 3.355 | 3.995 |
| 5 | 2.6725 | 2.593 | 3.53 | 3.505 | 4.085 |
| 10 | 2.843 | 2.7575 | 3.64 | 3.605 | 4.135 |
| 15 | 3.0415 | 2.9515 | 3.745 | 3.705 | 4.175 |
| 20 | 3.24 | 3.155 | 3.835 | 3.815 | 4.225 |
| 25 | 3.44 | 3.34 | 3.95 | 3.915 | 4.265 |
| 30 | 3.635 | 3.545 | 4.055 | 4.025 | 4.31 |
| 35 | 3.835 | 3.75 | 4.155 | 4.13 | 4.355 |
| 40 | 4.06 | 3.975 | 4.265 | 4.25 | 4.405 |
| 45 | 4.255 | 4.205 | 4.385 | 4.36 | 4.445 |
| 50 | 4.48 | 4.415 | 4.45 | 4.44 | 4.445 |

TABLE V

EPOXY TESTS:

Trial #1

| distance (mm) | 2.207 mm of epoxy between transducer and material | | | |
|---|---|---|---|---|
| | Al5182 (t=2.08) | Al5182 (t=1.04) | EGCR3 (t=0.88) | 1018 Steel (t=0.6) |
| 0 | 3.76 | | 3.73 | 3.95 | 4.27 |
| 5 | 3.84 | 3.8 | 4.02 | 4.31 |
| 10 | 3.92 | 3.88 | 4.08 | 4.34 |
| 15 | 4.01 | 3.97 | 4.14 | 4.36 |
| 20 | 4.1 | 4.04 | 4.2 | 4.39 |
| 25 | 4.17 | 4.12 | 4.26 | 4.41 |
| 30 | 4.25 | 4.2 | 4.3 | 4.43 |
| 35 | 4.33 | 4.28 | 4.36 | 4.45 |
| 40 | 4.42 | 4.36 | 4.41 | 4.47 |
| 45 | 4.51 | 4.44 | 4.47 | 4.49 |
| 50 | 4.59 | 4.5 | 4.52 | 4.5 |

Trial #2

| Distance (mm) | 2.207 mm of epoxy between transducer and material | | | |
|---|---|---|---|---|
| | Al5182 (t=2.08) | Al5182 (t=1.04) | EGCR3 (t=0.88) | 1018 Steel (t=0.6) |
| 0 | 3.71 | 3.74 | 3.98 | 4.3 |
| 5 | 3.78 | 3.81 | 4.04 | 4.34 |
| 10 | 3.88 | 3.9 | 4.11 | 4.36 |
| 15 | 3.97 | 3.97 | 4.16 | 4.38 |
| 20 | 4.06 | 4.05 | 4.21 | 4.39 |
| 25 | 4.14 | 4.13 | 4.26 | 4.41 |
| 30 | 4.23 | 4.21 | 4.31 | 4.43 |
| 35 | 4.3 | 4.27 | 4.37 | 4.44 |
| 40 | 4.39 | 4.36 | 4.42 | 4.46 |
| 45 | 4.48 | 4.45 | 4.47 | 4.48 |
| 50 | 4.57 | 4.52 | 4.53 | 4.49 |

Average

| Distance (mm) | 2.207 mm of epoxy between transducer and material | | | |
|---|---|---|---|---|
| | Al5182 (t=2.08) | Al5182 (t=1.04) | EGCR3 (t=0.88) | 1018 Steel (t=0.6) |
| 0 | 3.735 | 3.735 | 3.965 | 4.285 |
| 5 | 3.81 | 3.805 | 4.03 | 4.325 |
| 10 | 3.9 | 3.89 | 4.095 | 4.35 |
| 15 | 3.99 | 3.97 | 4.15 | 4.37 |
| 20 | 4.08 | 4.045 | 4.205 | 4.39 |
| 25 | 4.155 | 4.125 | 4.26 | 4.41 |
| 30 | 4.24 | 4.205 | 4.305 | 4.43 |
| 35 | 4.315 | 4.275 | 4.365 | 4.445 |
| 40 | 4.405 | 4.36 | 4.415 | 4.465 |
| 45 | 4.495 | 4.445 | 4.47 | 4.485 |
| 50 | 4.58 | 4.51 | 4.525 | 4.495 |

TABLE VI

LUBRICANT TESTS:

each sample was coated with lubricant

| uncovered (mm) | distance between material and transducer = 2.207mm | | | | |
|---|---|---|---|---|---|
| | Al5182 (t=2.08) | Al5182 (t=1.04) | EGCR3 (t=0.88) | EGCR3 (t=0.76) | 1018 Steel (t=0.60) |
| 0 | 3.62 | 3.64 | 3.87 | 3.83 | 4.16 |
| 5 | 3.67 | 3.66 | 3.92 | 3.9 | 4.21 |
| 10 | 3.79 | 3.75 | 3.99 | 3.97 | 4.25 |
| 15 | 3.88 | 3.84 | 4.06 | 4.03 | 4.27 |
| 20 | 3.96 | 3.93 | 4.12 | 4.09 | 4.29 |
| 25 | 4.05 | 4.01 | 4.17 | 4.15 | 4.32 |
| 30 | 4.15 | 4.09 | 4.22 | 4.21 | 4.34 |
| 35 | 4.25 | 4.18 | 4.29 | 4.27 | 4.37 |
| 40 | 4.32 | 4.27 | 4.35 | 4.33 | 4.4 |
| 45 | 4.42 | 4.35 | 4.4 | 4.39 | 4.42 |
| 50 | 4.5 | 4.43 | 4.44 | 4.44 | 4.44 |

TABLE VII

| Al 5182 (t=1.04) Distance (mm) | Gap = 2.207mm Epoxy | Lubricant | Block only |
|---|---|---|---|
| 0 | 3.735 | 3.64 | 3.625 |
| 5 | 3.805 | 3.66 | 3.68 |
| 10 | 3.89 | 3.75 | 3.76 |
| 15 | 3.97 | 3.84 | 3.84 |
| 20 | 4.045 | 3.93 | 3.92 |
| 25 | 4.125 | 4.01 | 4 |
| 30 | 4.205 | 4.09 | 4.08 |
| 35 | 4.275 | 4.18 | 4.155 |
| 40 | 4.36 | 4.27 | 4.24 |
| 45 | 4.445 | 4.35 | 4.325 |
| 50 | 4.51 | 4.43 | 4.405 |

TABLE VIII

| EGCR3 (t=0.88) distance (mm) | Gap = 2.207 Epoxy | Lubricant | Block only |
|---|---|---|---|
| 0 | 3.965 | 3.87 | 3.86 |
| 5 | 4.03 | 3.92 | 3.915 |
| 10 | 4.095 | 3.99 | 3.975 |
| 15 | 4.15 | 4.06 | 4.035 |
| 20 | 4.205 | 4.12 | 4.095 |
| 25 | 4.26 | 4.17 | 4.14 |
| 30 | 4.305 | 4.22 | 4.195 |
| 35 | 4.365 | 4.29 | 4.24 |
| 40 | 4.415 | 4.35 | 4.305 |
| 45 | 4.47 | 4.4 | 4.365 |
| 50 | 4.525 | 4.44 | 4.42 |

What is claimed is:

1. A method for providing real time measurements of draw-in of metal during a metal forming process wherein a blank of sheet metal, which is held in place by at least one tool of a sheet metal forming apparatus, is drawn into a deformation zone by a further tool, said method comprising the steps of:

locating an elongated sensor on at least one of the tools with the sensor positioned in the proximity of the deformation zone and adjacent to an edge of the sheet metal being formed;

drawing the sheet metal blank into the deformation zone, thereby translating said edge of the sheet metal blank from an initial position to a drawn position; and enabling the sensor to produce a response signal, the amplitude of which varies substantially linearly in direct correspondence with the amount of overlap between the sensor and a portion of the sheet metal blank adjacent said edge, as said edge of the sheet metal blank is being translated between the initial position to the drawn position during the forming process.

2. The method according to claim 1, wherein the sensor includes at least first and second elongated coils disposed in a signal coupling relationship, and wherein the step of enabling the sensor to produce a response signal includes applying a signal to said first coil for inducing a signal in said second coil, thereby producing the response signal.

3. The method according to claim 2, wherein the first and second coils are elongated and have a major axis, and further including orienting the first and second coils with said major axis extending generally along the direction of translation of the sheet metal blank.

4. The method according to claim 1, and further including the steps of producing a feedback signal from the response signal being produced by the sensor as said edge of the sheet metal blank is translated between the initial position and the drawn position, and using the feedback signal for controlling a parameter of the forming process as a function of retreat of said edge of the sheet metal blank into the deformation zone.

5. The method according to claim 1, wherein the sensor includes a only one coil, the self-inductance of the coil varying as a function of the amount of overlap between the sensor and said portion of the sheet metal blank, and further including the step of monitoring the self-inductance of the coil to produce the response signal.

6. The method according to claim 1, including locating the sensor on a surface of said one tool.

7. The method according to claim 1, including locating the sensor in a groove in said one tool.

8. The method according to claim 1, including locating the sensor in a aperture beneath the surface of said one tool.

9. A method for providing real time measurements of draw-in for closed loop control of a metal forming process wherein a blank of sheet metal, which is held in place by cooperating tools of a sheet metal forming apparatus, is drawn into a deformation zone by a further tool, said method comprising the steps of:

locating an elongated sensor on at least one of the tools with the sensor positioned in the proximity of the deformation zone and adjacent to an edge of the sheet metal being formed, the sensor including first and second coils disposed in a signal coupling relationship;

applying a signal to said first coil for inducing a signal in said second coil to produce a response signal, the amplitude of which varies continuously in direct correspondence with the amount of overlap between the sensor and a portion of the sheet metal blank adjacent said edge as said edge of the sheet metal blank is being translated between the initial position and the drawn position;

drawing the sheet metal blank into the deformation zone, thereby translating said edge of the sheet metal blank from an initial position to a drawn position;

producing a feedback signal from the response signal which varies as a function of the amount of overlap between the sensor and a portion of the sheet metal blank adjacent said edge, as said edge of the sheet metal blank is being translated between the initial position and the drawn position; and using the feedback signal for controlling a parameter of the forming process as a function of retreat of said edge of the sheet metal blank into the deformation zone.

10. The method according to claim 9, wherein the response signal varies substantially linearly with translation of said edge of the sheet metal blank.

11. The method according to claim 9, wherein the first and second coils are elongated and have a major axis, and further including orienting the first and second coils with said major axis extending along the direction of translation said edge of the sheet metal blank.

12. A system for providing real time measurements of draw-in for closed loop control of a metal forming apparatus which includes cooperating tools for holding in place a blank of sheet metal while the sheet metal blank is drawn into a deformation zone by a further tool during the forming process, said system comprising:

at least one sensor located on one of the tools, the sensor positioned in the proximity of the deformation zone and adjacent to an edge of the sheet metal being formed;

the sensor providing an output signal the amplitude of which changes substantially linearly in direct correspondence with the amount of overlap between the sensor and a portion of sheet metal blank adjacent to said edge as the sheet metal blank is drawn into the deformation zone, resulting in translation of said edge of the sheet metal blank from an initial position to a drawn position;

a circuit for producing a feedback signal from the output signal as said edge of the sheet metal blank is drawn into the deformation zone; and a processor for using the feedback signal to control a parameter of the forming process as a function of retreat of said edge of the sheet metal blank into the deformation zone.

13. The system according to claim 12, wherein the sensor is located in an beneath the surface of said one tool.

14. The system according to claim 12, wherein the sensor is located in a groove in a groove in a surface of said one tool.

15. The system according to claim 12, wherein the sensor is in the form of a tape-on sensor.

16. A sensor for use in measuring draw-in of a sheet metal blank into the deformation zone, resulting in translation of an edge of the sheet metal blank along an axis from an initial position to a drawn position, said sensor comprising:

a base; and conductive material disposed on the base-forming first and second coils which include a primary excitation coil and only one detection coil, the excitation coil and the detection coil disposed on the base in a signal coupling relationship, the excitation coil and the detection coil each being elongated and each having a major axis that extends in the direction of translation of the edge of the sheet metal blank.

17. The sensor according to claim 16, wherein the first and second coils are flat, generally rectangular in shape.

18. The sensor according to claim 16, wherein the excitation coil is located within the detection coil.

19. The sensor according to claim 16, wherein the base comprises a flexible polymer.

20. The sensor according to claim 16, wherein the length of the base is about two centimeters to about ten centimeters and the width of the base is about one millimeter to about one centimeter.

21. The sensor according to claim 16, wherein the detection coil is located within the excitation coil.

* * * * *